(12) United States Patent
Jones et al.

(10) Patent No.: US 12,182,593 B2
(45) Date of Patent: Dec. 31, 2024

(54) INTERACTIVE COMPUTING RESOURCE

(71) Applicant: Grypp Corp Limited, Northampton (GB)

(72) Inventors: Pete Jones, Northampton (GB); Adam Lancey, Northampton (GB); Jemal Patel, Northampton (GB)

(73) Assignee: GRYPP CORP LIMITED, Northampton (GB)

( * ) Notice: Subject to any disclaimer, the term of this patent is extended or adjusted under 35 U.S.C. 154(b) by 0 days.

(21) Appl. No.: 17/917,917

(22) PCT Filed: Apr. 9, 2021

(86) PCT No.: PCT/GB2021/050881
§ 371 (c)(1),
(2) Date: Oct. 7, 2022

(87) PCT Pub. No.: WO2021/205187
PCT Pub. Date: Oct. 14, 2021

(65) Prior Publication Data
US 2023/0153128 A1 May 18, 2023

(30) Foreign Application Priority Data
Apr. 9, 2020 (GB) ..................... 2005272

(51) Int. Cl.
*G06F 9/451* (2018.01)
*G06F 3/04812* (2022.01)
*H04L 65/1089* (2022.01)

(52) U.S. Cl.
CPC .......... *G06F 9/451* (2018.02); *G06F 3/04812* (2013.01); *H04L 65/1089* (2013.01)

(58) Field of Classification Search
CPC .. G06F 9/451; G06F 9/04812; G06F 3/04812; H04L 65/1089
See application file for complete search history.

(56) References Cited

U.S. PATENT DOCUMENTS

| | | | |
|---|---|---|---|
| 8,739,044 B1 * | 5/2014 | Varadarajan | G06Q 30/0643 709/204 |
| 9,098,832 B1 | 8/2015 | Scardino | |

(Continued)

OTHER PUBLICATIONS

Sep. 29, 2020—(GB) Examination Report—GB2005272.6.

(Continued)

*Primary Examiner* — Tadesse Hailu
(74) *Attorney, Agent, or Firm* — Banner & Witcoff, Ltd.

(57) ABSTRACT

A system and method for generating a persistent addressable computing resource, the method comprising steps of generating data to render a first user interface on a display. Providing an address for the computing resource, wherein the computing resource includes the data to render the first user interface. Providing data for a second user interface, wherein the first and second users interfaces are different and the first and second user interfaces are configured to communicate with each other within a communication session and across a network and further wherein the second user interface includes functionality to provide digital content within the first user interface. Change the digital content provided within the first user interface, wherein the digital content remains available within the computing resource via the address after the communication session between the first and second user interfaces has ceased.

25 Claims, 32 Drawing Sheets

(56) References Cited

U.S. PATENT DOCUMENTS

| | | | | |
|---|---|---|---|---|
| 10,126,927 B1* | 11/2018 | Fieldman | | G06F 3/1454 |
| 10,277,522 B1* | 4/2019 | Canton | | H04L 47/70 |
| 10,652,286 B1* | 5/2020 | George | | H04L 67/55 |
| 10,768,885 B1* | 9/2020 | Fieldman | | H04L 65/403 |
| 11,115,302 B1* | 9/2021 | Sainanee | | G06F 16/958 |
| 11,216,237 B2* | 1/2022 | Walmsley | | H04L 65/75 |
| 11,627,173 B2* | 4/2023 | Wiklund | | H04L 65/765 |
| | | | | 709/224 |
| 2006/0011716 A1* | 1/2006 | Perkowski | | G06Q 30/02 |
| | | | | 235/375 |
| 2007/0150480 A1* | 6/2007 | Hwang | | H04M 3/42161 |
| 2011/0286584 A1* | 11/2011 | Angel | | H04M 3/42221 |
| | | | | 379/88.02 |
| 2012/0089410 A1* | 4/2012 | Mikurak | | G06Q 10/00 |
| | | | | 705/1.1 |
| 2012/0117153 A1 | 5/2012 | Gunasekar et al. | | |
| 2013/0103841 A1* | 4/2013 | Werth | | H04M 3/5191 |
| | | | | 709/227 |
| 2014/0136443 A1* | 5/2014 | Kinsey, II | | G06Q 30/0282 |
| | | | | 705/347 |
| 2015/0135206 A1* | 5/2015 | Reisman | | H04H 20/93 |
| | | | | 725/18 |
| 2015/0178388 A1 | 6/2015 | Winnemoeller et al. | | |
| 2015/0288672 A1* | 10/2015 | Patten | | H04L 63/08 |
| | | | | 726/28 |
| 2016/0125414 A1* | 5/2016 | Desai | | G06Q 20/10 |
| | | | | 705/17 |
| 2021/0185276 A1* | 6/2021 | Peters | | G06V 20/41 |
| 2021/0289006 A1* | 9/2021 | Hill | | H04L 65/4015 |

OTHER PUBLICATIONS

Jun. 30, 2021—(WO) International Search Report and Written Opinion—PCT/GB2021/050881.

Tabor, Marco et al, "Don't Panic", Open-Xchange, 17th edition, p. 2-325, Oct. 2, 2017 https://f.hubspotusercontent40.net/hubfs/9391640/Imported%20files/Mobile_Developers_Guide_17thEdition_Web.pdf.

\* cited by examiner

INTERACTIVE COMPUTING RESOURCE

CROSS-REFERENCE TO RELATED APPLICATIONS

This application is a U.S. National Stage application under 35 U.S.C. § 371 of International Application PCT/GB2021/050881, filed Apr. 9, 2021, which claims the benefit of priority to United Kingdom Patent Application GB 2005272.6, filed Apr. 9, 2020. Benefit of the filing date of each of these prior applications is hereby claimed. Each of these prior applications are hereby incorporated by reference in its entirety.

FIELD OF THE INVENTION

The present invention relates to a system and method for creating an interactive electronic asset or computing resource during a communication session that persists after the communication session ends.

BACKGROUND OF THE INVENTION

Multimedia collaboration applications allow communications between different parties to be interactive. For example, certain platforms allow conversations to take place between parties using text, audio and video media simultaneously. Certain platforms allow screen-sharing functionality in which one party can view the screen of another party during the call and this allows information to be conveyed in a way that all parties are looking at the same digital content at the same time.

In other systems, chat sessions can take place between parties in a text-based format and these can be useful for helpdesk provision and interactions between an agent within an organisation and an end-user of a service provided by that organisation. Furthermore, such chat-based communication may be used as part of sales or other commercial activity and where end-users can obtain support from an organisation via an agent.

Where one or both of the parties has a small device, such as a smartphone, then conversations can lack visual interaction. It can also be difficult for current systems to coordinate more than one messaging session at a time.

Where communications platforms allow digital media to be shared then this tends to involve one party presenting a document or other digital work to one or more other parties, which can lack full participation.

After a chat session ends then parties may be left with a transcript of the text sent and received during the session. However, the transcript does not always provide a full and complete record of events taking place within the session, especially when the communication session includes digital content other than text. It can also be difficult for one party to be aware of what another party has viewed during the session and afterwards.

Therefore, there is required a method and system that overcome these problems.

SUMMARY OF THE INVENTION

A system and method is provided to enable parties to communicate using their own interface where the content of the communication session remains available to one or both parties after the communication session has ended. At least one parties may add, remove, alter or otherwise change digital content forming part of that communication session and such digital content remains available to one or more other participants after the communication session ends. That is, a personalised digital asset may be synchronously created.

The communication session is initiated by the generation of an invitation or other data to be sent to another party of the communication session. An electronic address or other pointer (preferably unique) is provided as part of this invitation and the address provides access to a particular resource. This addressable resource includes a user interface used within the communication session. Another different user interface is also generated. Two-way and real-time communication is provided between the user interfaces by a communication session that is formed between the user interfaces. One user interface provides digital content to the other user interface and this digital content may be changed by either or both parties. When the communication session ends then the computing resource persists and can be accessed from the original address.

A communication session may be described as a two-way (or more) and real-time exchange of information in which each party may contribute and both transmit to and receive the information from the other party or parties. Ending the communication session results in such an exchange of information (in both directions) ceasing.

In accordance with a first aspect there is provided a system for generating a persistent addressable computing resource, the system comprising:
  at least one processor; and
  memory storing computer-executable instructions that, when executed by the at least one processor, cause the system to:
    generate data to render a first user interface on a display;
    provide an address for the computing resource, wherein the computing resource includes the data to render the first user interface; and
    provide data for a second user interface, wherein the first and second users interfaces are different and the first and second user interfaces are configured to communicate with each other within a communication session and across a network and further wherein the second user interface includes functionality to:
    provide digital content within the first user interface; and
    change the digital content provided within the first user interface, wherein the digital content remains available within the computing resource via the address after the communication session between the first and second user interfaces has ceased. The address may be created before, during or after the communication session. A user of the first user interface is a person and the first user interface may be a graphical user interface on a device. A user of the second user interface may also be a person. The second user interface may be rendered on a separate device. In one example implementation, the user of the second user interface may be a computer system approximating the responses of a person. For example, this user may be an artificial intelligence (AI) system. In this case, the second user interface does not need to be rendered (but may be if external monitoring is required). The at least one processor may include one or more processors.

Optionally, the first user interface may also change the digital content provided by the second user interface. These changes also persist as a change to the computing resource after the communication session ceases. These changes may be stored in a database and/or associated with the communication session (e.g. using a communication session identifier). Preferably, a user of the second user interface retains control over all changes.

Preferably, the first and/or second user interface (e.g. graphical user interfaces or other components) may be configured to cease communication with the other user interface on receiving a command. For example, the user of the second user interface may issue a command to end a call session.

Preferably, the system may further comprise:
a database; and
a server configured to store within the database the address of the computing resource and the changed digital content. Therefore, data defining the computer resource may persist within the database (or more than one database). The server can add data defining the computing resource and may also retrieve such data to make the computing resource accessible.

Optionally, the memory storing computer-executable instructions that, when executed by the at least one processor, may further cause the system to:
generate a session identifier for the communication session between the first and second user interfaces;
associate the session identifier with the address of the computing resource; and
store the session identifier within the database. Therefore, the computing resource and the communication session can be linked for later retrieval and/or editing of non-sensitive/locked data.

Optionally, the server may be further configured to respond to a browser request issued to the address of the computing resource and in response retrieve the stored digital content and provide the retrieved digital content to the requester in the form when the communication between the first and second user interfaces ceased. The server may comprise more than one component including a web service or webserver. This webserver component may respond to browser (e.g. HTTP or HTTPS) requests and provide data necessary to provide the computing resource to the requester.

Optionally, the memory storing computer-executable instructions that, when executed by the at least one processor, further causes the system to store in the database a transcription of communications between the first user interface and the second user interface.

Preferably, the address may be unique. Therefore, the computing resource can be specific for a particular communication session or set of linked communication session (if the session is restarted).

Optionally, the communication session between the first and second user interfaces may be a chat session. For example, this may be a text-based chat session.

Optionally, the memory storing computer-executable instructions that, when executed by the at least one processor, may further cause the system to:
send an electronic invitation to a user, wherein the electronic invitation includes the address of the computing resource. The invitation may be an electronic invitation sent by suitable means such email and/or SMS.

Optionally, the first user interface may be provided in response to an activation of the electronic invitation. For example, the invitation may include a link (e.g. a URL) that is selected and that launches the user interface within a browser (e.g. IE, Chrome, Firefox, etc.)

Optionally, the system may further comprise:
a server configured to receive a browser request directed to the address of the computing resource;
retrieve digital content associated with the address of the computing resource; and
provide the digital content in response to the browser request.

Optionally, changing the digital content rendered on the first user interface comprises any one or more of:
adding the digital content;
removing the digital content;
altering the digital content; and
recording a response to the digital content. Other changes may be made.

Optionally, generating data to render the first user interface on the display may further comprise detecting a device type used to display the user interface and format the first user interface according to the device type.

Optionally, the device type may be any one of: smartphone, tablet computer, desktop computer, smart TV or other digital device. Other devices may be used.

Optionally, wherein generating data to render the first user interface on the display may further comprise detecting an orientation of a device used to display the user interface and format the first user interface according to the device orientation. This may be achieved by querying from the device a parameter indicating an accelerometer output or other sensor. Such a parameter may be updated in real-time and/or during the communication session, for example. The parameter may also be used to provide information to the second user interface regarding the orientation of the device. This may result in the second user interface changing to reflect how the first user interface is being rendered (i.e. according to its orientation).

Optionally, generating data to render the first user interface on the display may further comprise detecting a change in window size and/or aspect ratio used to display the user interface and format the first user interface according to the changed window size and/or aspect ratio. This may be achieved by providing one or more further parameters to the system indicating window properties. Again, the parameter may also be used to provide information to the second user interface regarding the display window of the other device. This may result in the second user interface changing to reflect how the first user interface is being rendered (i.e. according to its window size and/or aspect ratio).

Optionally, formatting the first user interface according to the changed window size and/or aspect ratio may occur in real-time.

Optionally, the memory storing computer-executable instructions that, when executed by the at least one processor, may further cause the system to display within the second user interface an indication of what is currently being displayed on the first user interface, including any changes made to the orientation, window size and/or aspect ratio of the first user interface. For an automated agent (e.g. using AI), these changes do not need to be displayed but may nevertheless be used to monitor how and what is being displayed within the first user interface.

The mirroring of the first user interface on the second user interface (i.e. device orientation and window size/aspect ratio) features may be used independently of the other features and may form a separate embodiment for use in other settings not limited to persistent computer resource generation.

In accordance with a further aspect, there is provided a system and method for generating data to render a first user interface on a display comprising detecting a change in window size and/or aspect ratio (and/or orientation of a device) used to display the user interface and format the first user interface according to the changed window size and/or aspect ratio (and/or orientation). The detected changes are communicated to a second user interface. These changes may be displayed on the second user interface, for example.

Optionally, the memory storing computer-executable instructions that, when executed by the at least one processor, may further cause the system to mirror an action occurring within the second user interface on the first user interface.

Optionally, the action may include any one or more of: moving a cursor, typing text, highlighting, clicking, pointing and digital content opening.

Optionally, the address for the computing resource is a Uniform Resource Locator, URL. Other address types may be used.

Optionally, the address of the computing resource expires after a predetermined time. The computer resource can expire and become unavailable after a predetermined time even if the user tries to access it with the same invitation and/or address.

Optionally, the first user interface may include functionality to:

provide digital content within the second user interface; and/or change the digital content provided within the second user interface. The first user interface may have functionality to make different changes to the digital content. For example, whilst the first user interface may contain functionality to add digital content, the second user interface may provide functionality to alter such digital content by for example, filling in form fields and using wands (to highlight particular portions of the digital content). The first user interface may still upload or add content but this may be dependent on permission being granted by a user of the second user interface, for example.

Preferably, the network is the internet. Other networks may be used (e.g. internal networks, VPNs, etc.)

According to a second aspect, there is provided a method for generating a persistent addressable computing resource, the method comprising:

generating data to render a first user interface on a display;

providing an address for the computing resource, wherein the computing resource includes the data to render the first user interface; and providing data for a second user interface, wherein the first and second users interfaces are different and the first and second user interfaces are configured to communicate with each other within a communication session and across a network and further wherein the second user interface includes functionality to:

provide digital content within the first user interface; and change the digital content provided within the first user interface, wherein the digital content remains available within the computing resource via the address after the communication session between the first and second user interfaces has ceased. The method may include any or all of the features described with reference to the system.

The methods described above may be implemented as a computer program comprising program instructions to operate a computer. The computer program may be stored on a computer-readable medium.

The computer system may include a processor or processors (e.g. local, virtual or cloud-based) such as a Central Processing unit (CPU), and/or a single or a collection of Graphics Processing Units (GPUs). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example. The computer system may operate in a server based environment or a virtual environment (e.g. virtualised processors and databases), such as a cloud-computing system.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which:

FIGS. 5A to 5H show screenshots of the user interfaces with reference to FIG. 1;

FIGS. 6A to 6F show screenshots of the user interfaces with reference to FIG. 1;

FIGS. 8A to 8J show screenshots of the user interfaces with reference to FIG. 1;

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
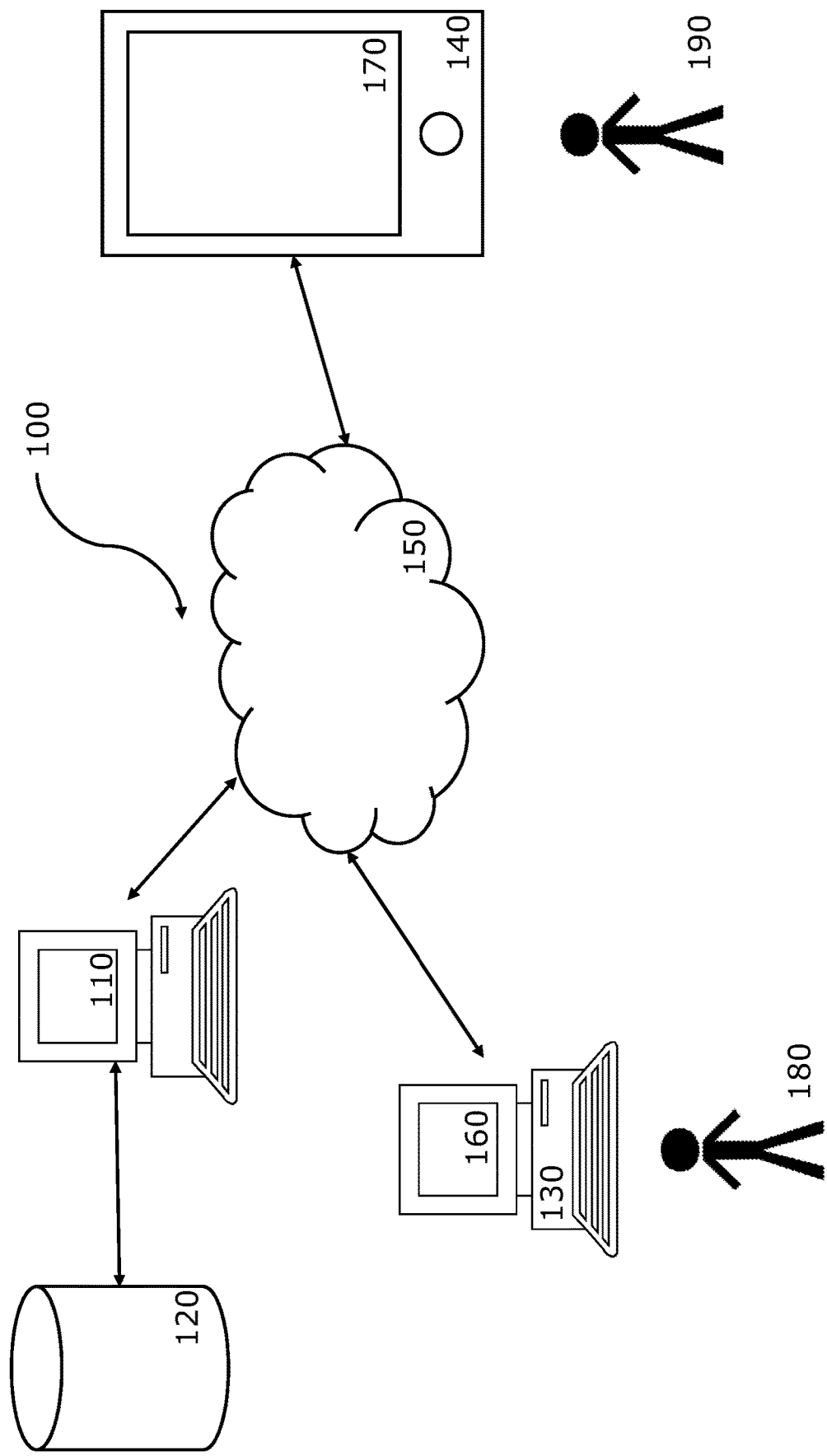
FIG. 1 shows a schematic diagram of a system for generating a persistent addressable computing resource and a communications session between user interfaces.

The system can overlay voice and chat or messaging communications to enable people to engage in the real-time synchronous remote viewing during a communication session, whilst enabling manipulation of digital content or assets (examples of asset types include documents, forms, diagrams, images, videos, calculators, spreadsheets, presentations, and maps). Manipulation of the digital content can include configuring and arranging of assets and data from multiple sources by an agent who may initiate a call. In an example implementation, this may be achieved using an application programming interface (API) connection with a third party asset and data sources or by manual insertion of the digital content to present one or more participants of the communication session with a way of viewing and selecting components, products, and/or services to create a chosen outcome which may be viewed or left for future viewing. The communication session forms part of a persistent computing resource that may be reached from an address provided before (or during) the communication session. When the communication session takes place in the context of a sales event, a product or service may be purchased either during the communication session or afterwards through the addressable computing resource. The addressable computing resource may include functionality to initiate a call back after an initial communication session has ended. Therefore, the address can be used to both initiate the communication session and access the computing resource after the communication session has ceased.

A dedicated or unique data thread maintains the state and/or form of the communication session of the addressable computing resource. For example, a participant's choices, selections and digital content that have been shared during the communication session may remain accessible afterwards. For example, this may be a personalised digital asset and may take the form of a personalised website.

In one example implementation, the addressable computing resource may remain available for a limited or predetermined and configurable time (e.g. 30 days). This enables all connected parties to the communication session to see and interact with the digital content in real-time and collaboratively preferably with an agent or call initiator able to view what the connected parties are doing. This may include one party (e.g. the call initiator) having the ability to view properties of the device of an invited participant. This may include information regarding the orientation of the devices or devices in use by each communication session participant. Furthermore, each participant can view actions of the call initiator. Either or both parties to the communication session have the ability to bring digital works (assets) into the communication session. These assets can be documents, audio, video, or images, for example.

There will be in general two types of user interfaces used by communication session participants. These two types of user interfaces have different functionality. A first user interface is generated when a participant accepts an invitation to the communication session. The invitation includes an address of a computing resource where the computing resource includes data to render the first user interface.

A second user interface includes functionality to provide digital content to the first user interface and to change this digital content. The second user interface can also initiate the communication session by creating the invitation including the address and viewing how the first user interface renders such digital content. For example, if a device being used to render the first user interface is in landscape orientation then this may be viewed from the second user interface.

Participants to the communication session have the functionality provided by the user interfaces to:
1) Change the view of another participant. This can be in the form of a global user interface and mimics the appearance of the communication session on connected devices. This can be achieved through signalling in real-time to reflect a connected device's viewpoint and/or orientation.
2) Create real-time customise (e.g. personalised) digital content (e.g. digital multimedia records) during collaborative conversations over the communication session. That is, a personalised digital asset may be built synchronously. The user of the second user interface can interact with more than one other party each using a user interface of the first time. Therefore, a one-to-one or one-to-many participant sessions can take place. In one example implementation, artificial intelligence (AI) monitoring of separate digital channels can look for relevant cues to trigger a communication session. In an example, pre-populated data can be used within a communication without the need for human agent intervention. Post communication session access may be provided in various different formats and can provide data relating to activity taken by different participants. Such access may be provided by an address (e.g. link or URL) send in different forms including webpages, applications, and/or email. In an example, a 'basket' of goods and/or services may be included in the computing resource accessible by the address. Therefore, a participant may subsequently purchase the contents of the basket after the communication session completes. The address may be sent out before, during or after the communication session. The address may provide access to both the communication session and the computing resource or only the computing resource, for example.

3) The system may be optionally cloud-based and operate with real-time configurations of data for visual interactions and manipulations of the digital content between the remotely connected parties 4) The system provides a platform to create a fully interactive website or other computing resource, which can operate like a normal website in browse mode or be switched into a mode operating with full two-way interactive real-time collaboration between a guest and a remote agent, with independent rendering on both sides. This allows the agent to assist an end user or customer directly rather than telling the customer what to do This system has applications in a wide range of industry and usage types wherever real-time synchronous visual sharing of and interaction with documentation assets and data are required. This enhances remote conversations between two or more parties, leading to a better experience and outcome. Examples of such communication sessions include telephone calls, chat/messaging conversation and may be in the field of retail, sales, or customer service but with wider business and social applications.

The ability to transform a voice or messaging/chat-based conversation into a multi-sensory experience incorporating the visualisation of digital content (which may be introduced by the initiator or any participant) and interacting with this digital content in a collaborative fashion at least one party being 'fully sighted' (i.e. both or all participants can see what and how the other or others view the material).

The session initiator or user of the second user interface may be 'fully sighted' meaning that they can see exactly what each other participant is doing in real-time. This may commence when the accept the invitation to join the communication session and include data describing what device the other users are using, and how these devices are oriented, where the participant is viewing the digital content (e.g. a page of a document). Further indication of what the participant is doing with the digital content includes marking it up using annotation, highlighting, form-filling, and scrolling. Furthermore, the participant(s) may also be able to see what the agent is doing. This can provide a fully joined up and connected conversation.

All participants have the ability to highlight and annotate within the digital content (e.g. documents) and this can be done simultaneously by both or all participants. This can help explain and emphasise points, further enhancing a fully connected experience.

The system incorporates an integrated chat capability so that communication session participants can communicate in real-time without the need for voice.

The second user interface includes functions such as introducing digital content into the communication session (e.g. a document or form) for joint review or completion. Additional functionality includes full synchronous visualisation and interaction of the configuration of the digital content. For example, the digital content may include a customisable form defining a product, such as a car. The customisable form can be used to build an order consisting of numerous parts or the booking of a multi-layered offering consisting of different and selectable parts and services.

Following a communication session, the system provides the participant with an address providing future remote access to the personalised elements of the full conversation thread and visual assets for future events forming the computer resource. Examples of the use of this system include remote reflective purchasing of some or all of the items discussed during the communication session and/or requesting a call back from the communication session initiator.

This can take the form of a conversation thread formatted as a personalised or unique website accessible using the provided address. This address may be provided in advance of the communication session, live within the communication session or after the communication session has ended, e.g. within an email or similar communication. Examples of the use of this functionality include reflective review of products or services discussed during the communication session, detailed review of contractual forms, e.g. terms and conditions, and remote reflective decision making on purchases. This improves user experience as it removes the need to trawl through separate and non-customised websites to re-create the products and services which were discussed. This also removes the need to have another conversation with the same or different agent and so saves time and inconvenience and saving costs of a further call-back.

Service examples include the participator being able to upload video clips or images of items that may be faulty. The initiator or agent may to obtain images through the participant's device, for the participant to enable video and the initiator to use visual pointers and annotation to assist the process and for the joint visualisation of and interaction with relevant support documentation. Technical support communication may also benefit from this functionality.

In an example implementation, the initiator can communicate in real-time with multiple parties having the same visual conversation, sharing the same digital content (e.g. two people completing the same form at the same time) or with multiple parties having different visual conversations (e.g. different people completing different forms at different times or viewing different documents). This is achieve using a multi-view interface allowing the communication session initiator to view all participant activity and to selectively enter each view or conversation as required in order to have synchronous visual conversation with that participant. This provides a richer alternative to numerous forms of chat or messaging functions where the addition of rich media and visual assets makes for a more engaging remote experience allowing the initiator to handle more dialogues simultaneously without participants feeling like they are being 'left dangling' waiting for a reply as they will always have something to be doing or looking at and the agent will be able to judge their progress through having full sight of their positions within the shared selected digital content.

The system produces full analytics based on the interaction between the initiator and participant including when digital content (assets) were introduced, how long they were reviewed for, if values or other data were input and, when connected to third party systems such as CRM and order fulfilment systems. This provides intelligence on how such interactions affected purchasing decisions or improved call resolution times, or led to enhanced user or customer experience. In the sales environment this can indicate larger sales or less return, for example. Such additional information is currently not easily available and this additional insight is considered to be of significant value.

The fully synchronised multi-way viewing of and interacting with assets and data with the initiator being able to see exactly what the participant is doing with the asset at all times whether scrolling or annotating and what device is being used and the orientation of the device means that the initiator and participant are fully connected and sighted making for a stronger 'call' experience leading to improved outcomes.

Current phone-based conversations lack visual interaction. Other platforms do not include the full synchronous two-way interaction which leads to a fully connected conversation between initiators and participants—greatly enhancing the experience for both and leading to better outcomes. For example, agents in a contact centre can understand their clients better as they avoid the need to continually question where they are in the process or have protracted silences whilst they are unsighted.

Full two-way synchronous viewing interaction with and manipulation of assets and data brings the initiator and participant fully together.

Current chat or messaging platforms lack the visual elements and interaction that enrich the conversation and the system removes current frustrations that may exist when the initiator is dealing with multiple chat and messaging threads.

The visual interaction takes place where digital content is accessed using manual input (e.g. selecting from a datastore or database) or API linkage allowing for full reporting on usage and performance using an inbuilt analytics capability.

The ability to build complex scenarios together in real-time using a two-way interactive synchronised communication session uses assets and data brought into the screen space using API connectivity as and when needed to follow the flow of the conversation. The system may incorporate links to external systems such as a payment gateway, for example.

Examples of benefits to contact centres are: improved customer experience, improved agent experience with reduced agent turnover and lowered time to proficiency, reduced average handling time, increased sales, decreased returns, enhanced compliance, more transparent sighted interactions, increased first call resolutions, enhanced net promoter scores as well as improved communication.

The system is designed for use within contact centres to enhance the outcome of voice and messaging based conversations in the field of sales and support through two-way synchronous visual interactions of relevant assets which may include for example documents, forms, images, videos, maps, calculators, product and service configurations etc. However, other applications within general business communications (companies without contact centres using the platform to enhance a variety of business conversations) and wider user into non-business and social applications (such as the sharing of and synchronous interaction with images and documents between friends and family).

Other examples of the use of the system include improving the sending of documents and visual assets to the customers' devices for authentication or transaction during the call but where the agent is 'blind' to the customers' interactions. In existing systems this can otherwise include a waiting message until the customer has finished their deliberations. This can lead to awkward conversation gaps, unnecessary questions and disjointed conversations, an overall lack of real-time awareness by agents, especially newer agents, of their customers status e.g. 'have you finished reading that yet resulting in a disjointed conversation about a line of text where neither party can see where the other is. Furthermore, long descriptions between parties trying to get to a common understanding from a non-shared experience on a common document can become cumbersome.

The system is built with full content management system (CMS) capability to empower the contact centre to add their own digital content, data, assets and branding providing full control over the quantity and pace of change.

The system provides commercial communication, specifically allowing someone who wants to present documents that require approval and to talk people through the documents and to interact with people about the documents using an established bidirectional interaction with a person or client using an internet-connected computer (or over another network) therefore enabling the person or client to see the documents shown by the presenter on the computer screen through a 'presentation canvas' which forms part of a 'Presentation layer'.

In an example implementation, the system utilises a real-time communication framework, such as WebRTC®, which enables video, audio and data communication to take place via web browsers with no download, install plugin required. WebRTC® enables web browsers with Real-Time Communications (RTC) capabilities via simple JavaScript APIs and enables rich, high quality, RTC applications to be developed in the browser via JavaScript APIs and HTML5. The contact established comprises a bidirectional audio telephone and video communication between the client or person and the presenter.

FIG. 1 shows a schematic diagram of a system 100 for generating a persistent addressable computing resource. A server 110 contains at least one processor and memory that stores computer-executable instructions that cause at least one processor to generate data enabling a first user interface to be rendered on a display 170 of a first device 140. This first device 140 is operated by a first user 190.

The server 110 also generates an address for a computing resource that includes the data to render the first user interface (e.g. on a browser or dedicated application such as a mobile application, for example). The server 110 also generates data enabling a second user interface to be rendered on a display 160 of another separate computing device 130. This other computing device 130 is operated by a second user 180. The second user may be a person or may be a computer system, such as an artificial intelligence system, for example. In this case, the second user interface does not need to be rendered on a display and can instead in instantiated within the server 110.

The first and second user interfaces are different but may communicate with each other within a communication session across a network 150, which in this example is the internet. The second user interface includes functionality that can add digital content to the first user interface and also change that digital content.

Whilst the computing resource includes the first user interface providing communication with the second user interface, once the communication session ends then the generated address for the computing resource enables this computing resource to remain available. For example, the address may be a uniform resource locator (URL) for a particular web page that is unique. The computing resource also includes any or all of the information generated during the communication session including digital content added and/or changed by the second user 180 of the second user interface.

In this example implementation, a database 120 is in communication with (or forms part of) the server 110. This database stores a communication session identifier for the communication session as well as data relating to any of the digital content added and changed by the second user 180. The database can also store interactions between the first and second users (e.g. text). The database 120 is updated in real-time as the communication session proceeds so that as soon as it ends, the computing resource remains up-to-date and accessible using the generated address, which is also associated with the communication session.

Figure 2:
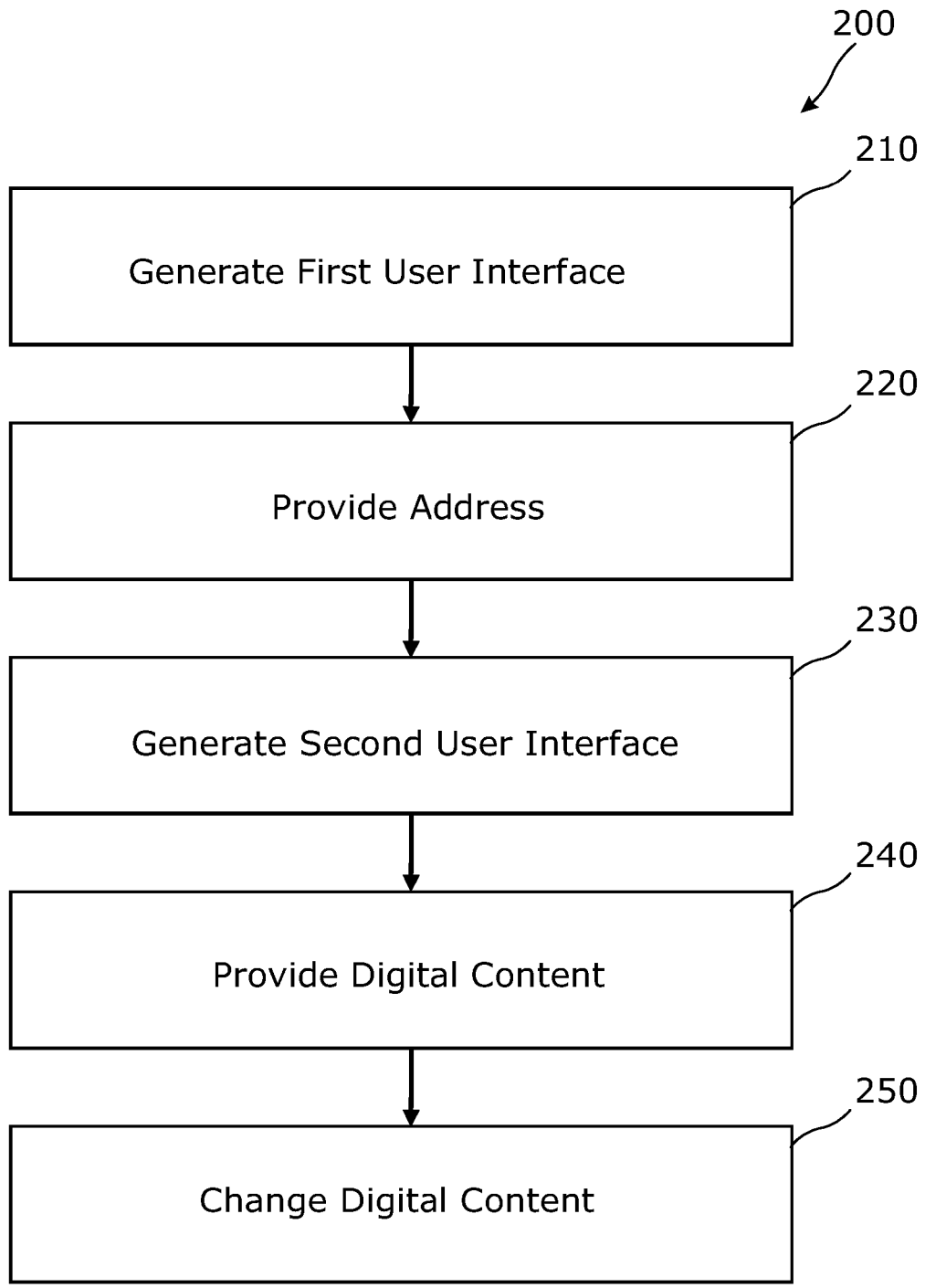
FIG. 2 shows a flow diagram of a method for using the system of FIG. 1.

FIG. 2 shows a flow diagram of a method 200 used to operate the system 100 of FIG. 1. At step 210, the first user interface is generated on the display 170 of the user device 140. The address of the computing resource is provided at step 220 and the second user interface is generated at step 230.

During the communication session, digital content is provided at step 240 and this digital content can be changed (e.g. by addition, deletion, or alteration) at step 250. Any of these changes are recorded in the database 120 and so they remain reflected in the computing resource once accessed by the address.

The address may be provided at the start, during or after the communication session ends. Whilst the user interfaces are different, they may also be rendered on different devices (or rendered virtually). In the example shown in FIG. 1, the first user's device is a tablet computer and the second user's device 130 is a desktop computer but other device types may be used.

It should also be noted that more than one server 110 and/or database 120 may be used to carry out different functions or for load balancing purposes. Similarly, the system 100 can be used by multiple users both operating first user interfaces (each different and specific to a particular communication session) and second user interfaces (again, each specific to a particular communication session). There can be one or more first user interfaces in communication with a single second user interface, for example.

In one example, the user 180 of the second user interface may be an agent of an organisation and the user 190 of the first user interface may be a customer of that organisation.

In one example implementation, the database 120 may operate using Microsoft SQL® and the data stored in the database 120 may be JSON data. However, other databases and data formats may be used.

Figure 3:
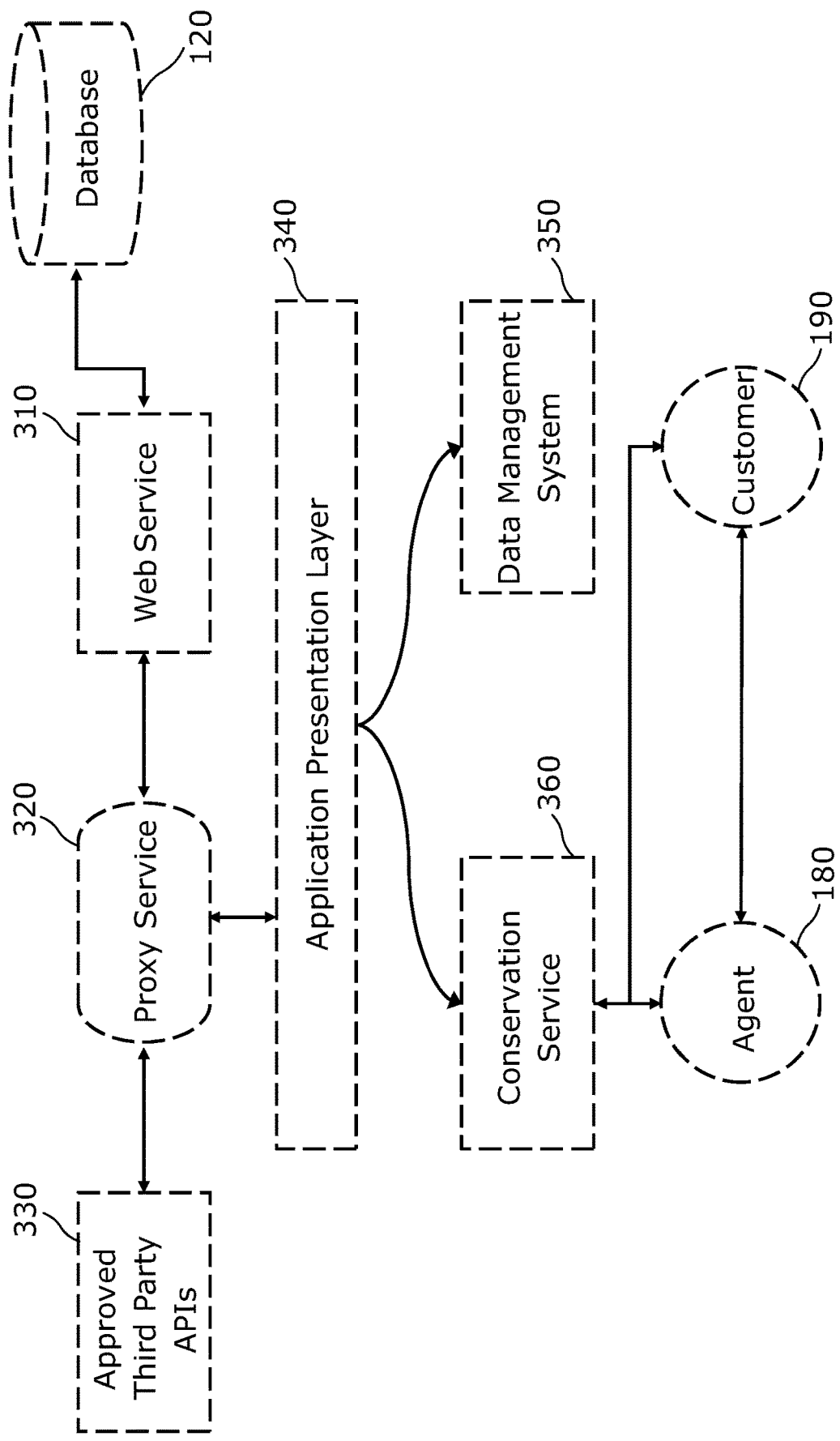
FIG. 3 shows a schematic diagram of further components of the system of FIG. 1.

FIG. 3 shows a further schematic diagram of the system of FIG. 1 but including further detail and components. The components of this figure are:

Approved Third Party APIs (330):
Connections are provided to clients and third-party APIs to receive and send data.
Proxy Service (320):
A routing service which manages where data should go based on a request.
Web Service (310):
Local and Public APIs to transmit data to and from the databases.
Database (120):
A storage for data.
Application Presentation Layer (340):
A layer that decides how and what data is going to be presented to the agent and customer.
Conversation Service (360):
This service sets up and manages communications between the agent and customer and post conversation services.

Data Management System (350):

A system that manages all data that is used during any interaction.

Agent (180):

The agent controls what to show the customer and is able to build customised content prior to showing. The agent is fully sited to as what the customer is seeing in the same screen ratio as the customer and has 2-way collaboration on the displayed content.

Customer (190):

The customer collaborates in real-time with the content that the agent displays. Post conversation, the customer, is able to go back and see a personalised view of the conversation is able to use call to action items in their own time.

The database is in communication with the web service 310 that is in communication with the proxy service 320, which is also in communication with third party APIs 330. The web service 310 and proxy service 320 respond to requests directed to the address generated by the server 110 when accessed by a customer 190. For example, the customer 190 may click on a URL link, which causes a request to be sent to the web service 310. This in turn which accesses data from the database 120 in order to format a response to the request. For example, this may be a HTTP request and response to a browser operating on the customer's device 140. The third party APIs 330 may be used to access digital object content provided by third parties and so not necessarily stored within the database 120 although the database 120 may store such content. The APIs can be used to add the digital content to the computing resource accessed using the address. The application presentation layer 340 formats the response to the request (e.g. using .NET). This can take into account the particular type of user device 140 and any other formatting requirements. The data management system 350 interacts with the application presentation layer 340 to manage data flows through the system. The documents, digital content and other objects accessed by APIs from third party sources may be formatted by the system for presentation on the user interface or may already be in the correct format. Different external or third party sources may be used or combined with data and digital content stored within the system (e.g. the database 120).

Preferably, the system 100 is modular allowing for different components to be added or removed, including those interacting with third party sources.

A conservation service 360 provides an interface between the agent's user interface and the customer facing application presentation layer 340. For example, this conservation service 360 can provide functionality to enable the agent 180 to add and/or change the digital content and make other changes and formatting of the customer's user interface.

Data flows between the components of FIG. 3 may be encrypted and secured. Individual communication sessions are identified and their data stored within the various components of the database 120. The single database 120 may also be implemented as separate datastores, for example.

Figure 4:
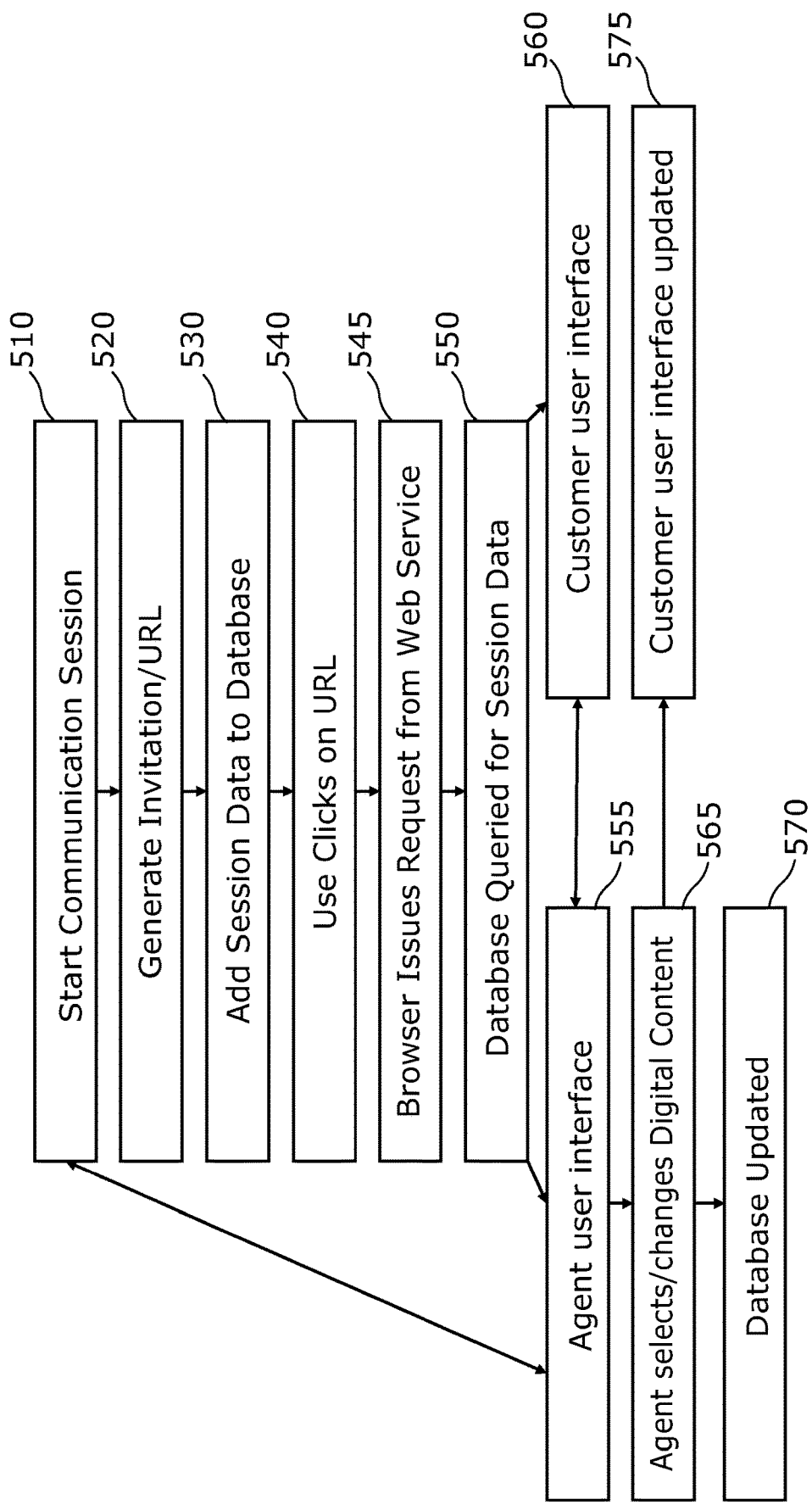
FIG. 4 shows a flow diagram of further method steps of the method of FIG. 2.

FIG. 4 shows a flowchart of the method 200 of FIG. 2 in more detail. In this example embodiment, the invitation to a communication session includes a URL for the computing resource. However, in other example implementations, similar method steps may take place but the communication session may commence by other means, such as through an existing website or mobile application, for example. Furthermore, the address to the computing resource may be provided at different stages throughout this method.

In this particular example, a communication session starts at step 510 and an invitation to this communication session is generated at step 520. The agent user interface 555 can initiate the communication session or this may be achieved by other means. As mentioned above, this invitation includes a URL to access the computing resource.

At step 530, session data for the communication session is added to the database 120. This session data includes the URL. Once the user clicks on the URL at step 540 then the communication session initiates by the user's browser or application issuing requests from the web service 310 at step 545. This results in the database being queried for session data at step 550 which occurs through the web service 310.

These steps result in the agent's user interface 555 and the customer's user interface 560 engaging in communications within the communication session. The agent can select and/or change digital content at step 565 which results in the customer's user interface being updated at step 575. At the same time, the database 120 is updated to reflect changes in the digital content. This occurs at step 570.

FIGS. 5A to 5H show screenshots of the user interface appearing on the first user's (customer) device 140 and the second user's (agent) device 130. These screenshots show the view from the second user who can view the user interface being presented to the first user as well as their own.

Figure 5A:
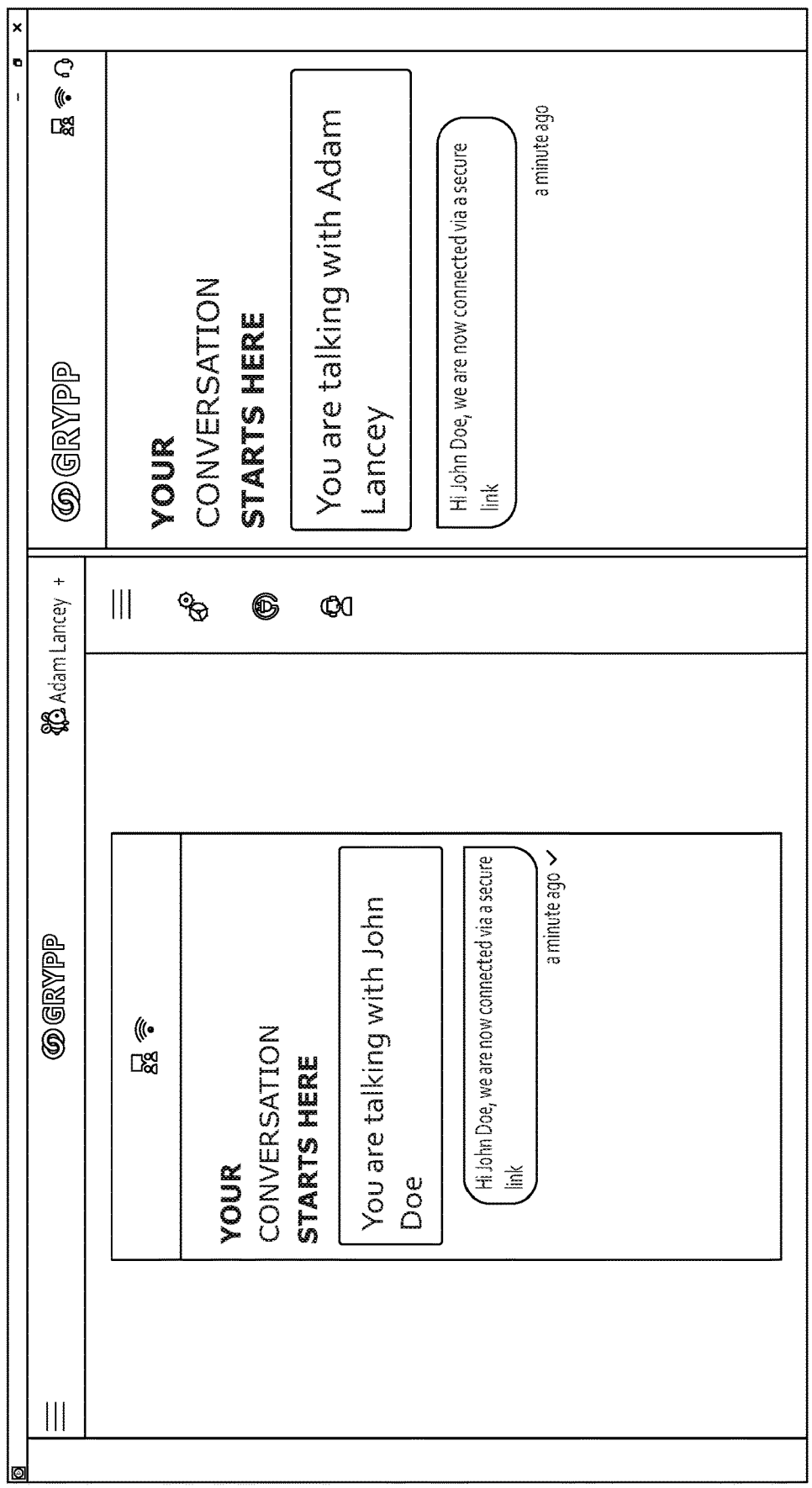

FIG. 5A shows a view after the communication session has been initiated with the customer's view shown on the right of this figure. Various tools and settings are available to the second user via this second user interface.

Figure 5B:
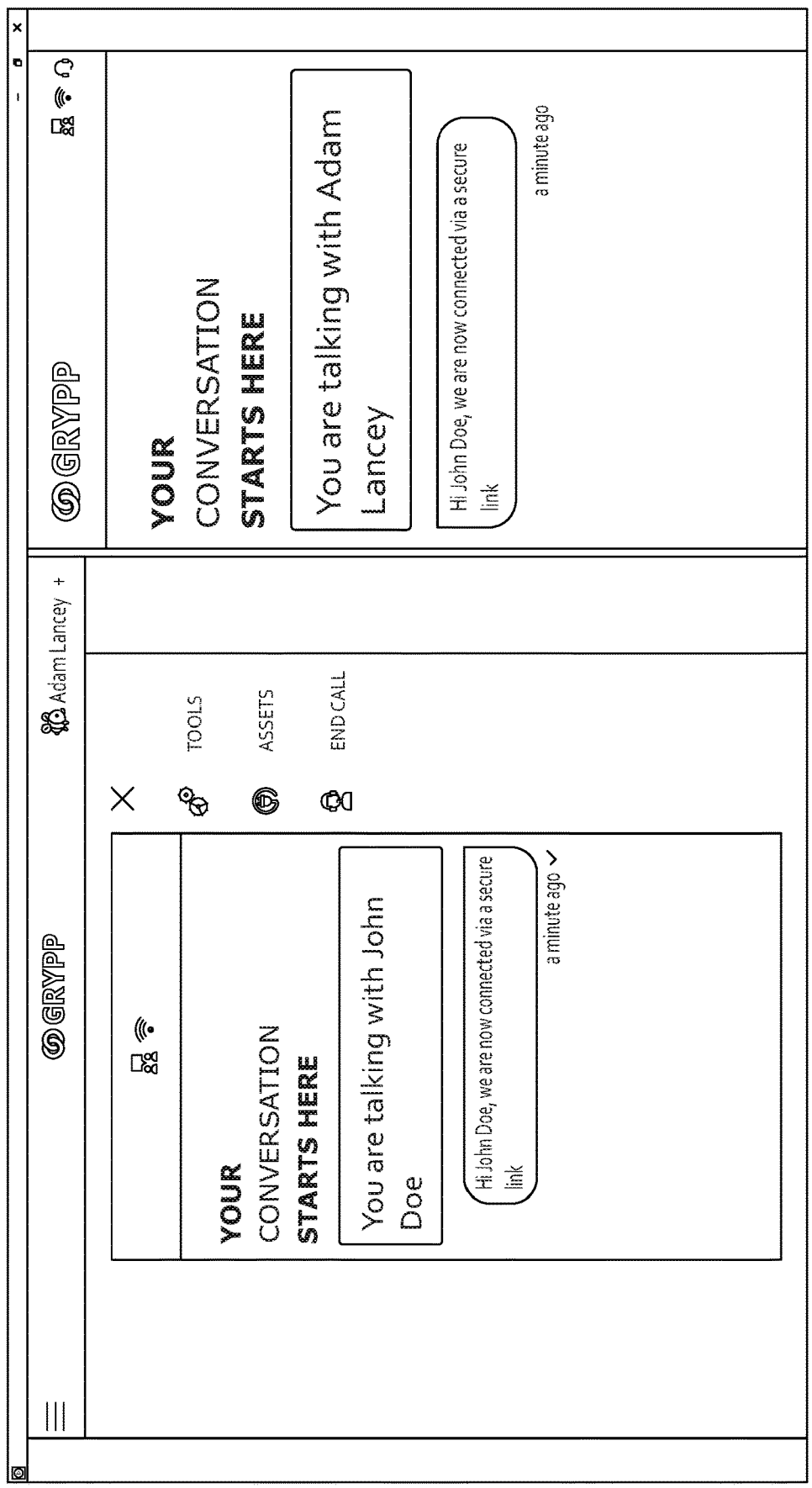
Figure 5C:
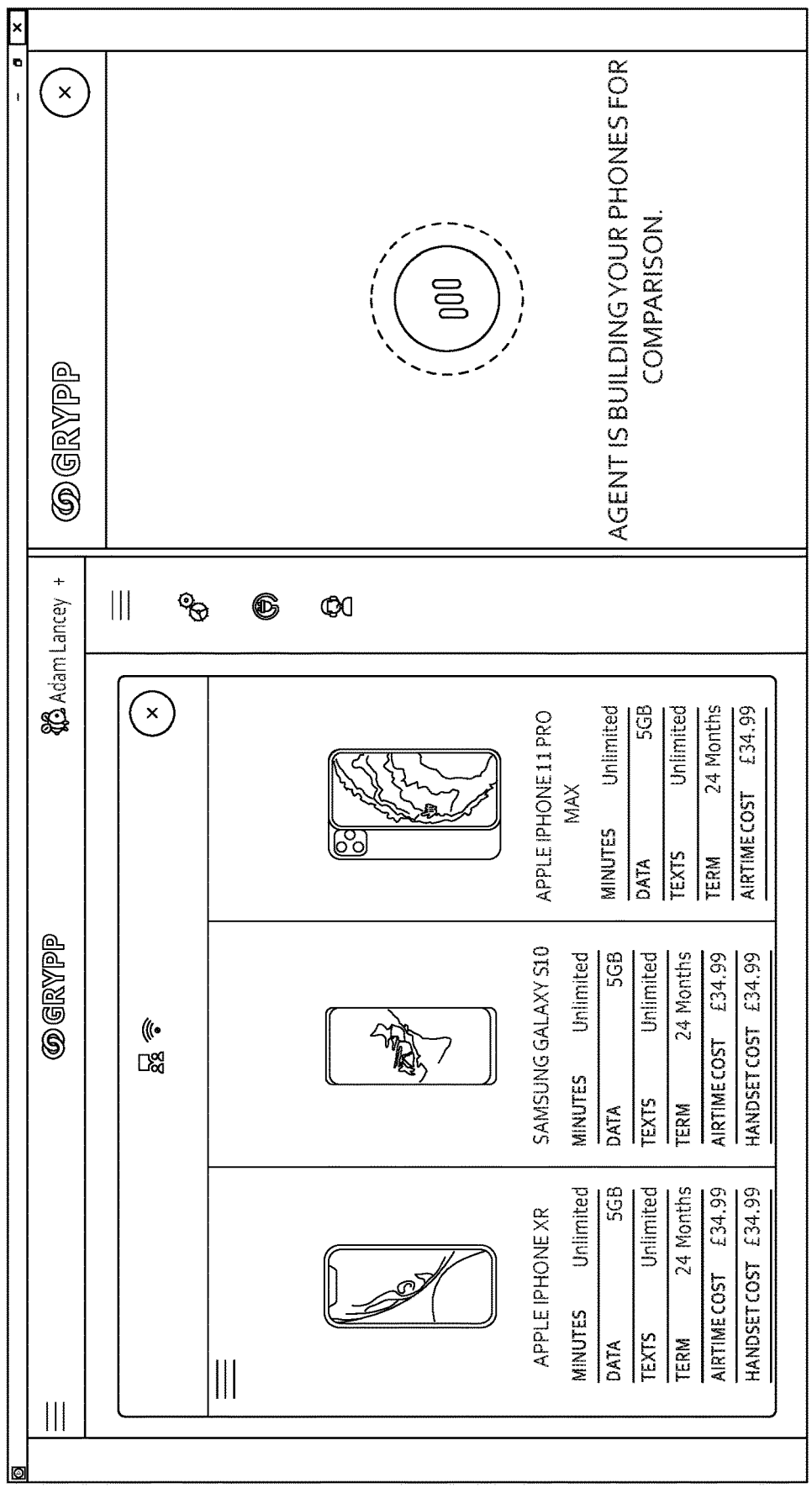
Figure 5D:
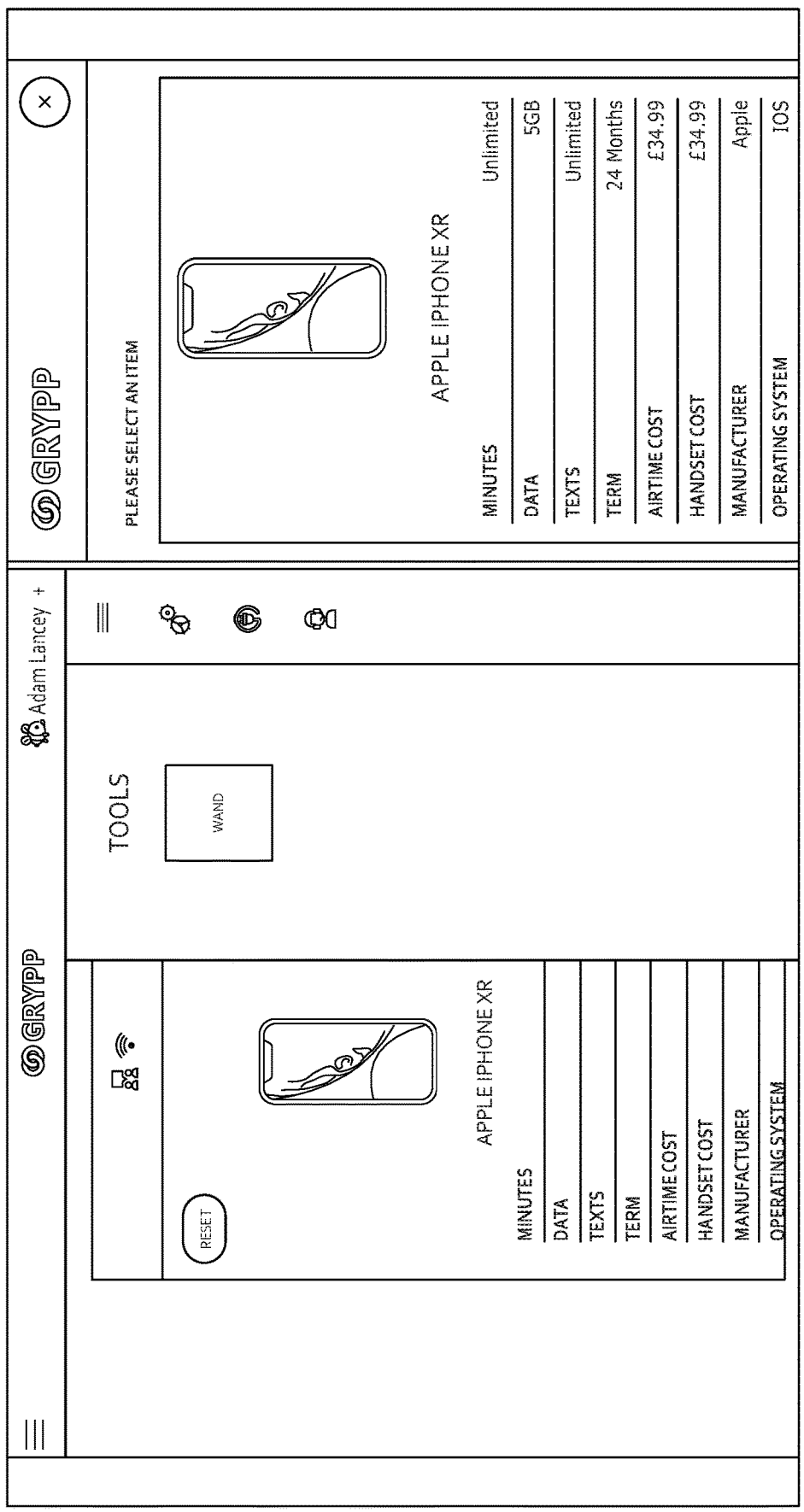
Figure 5E:
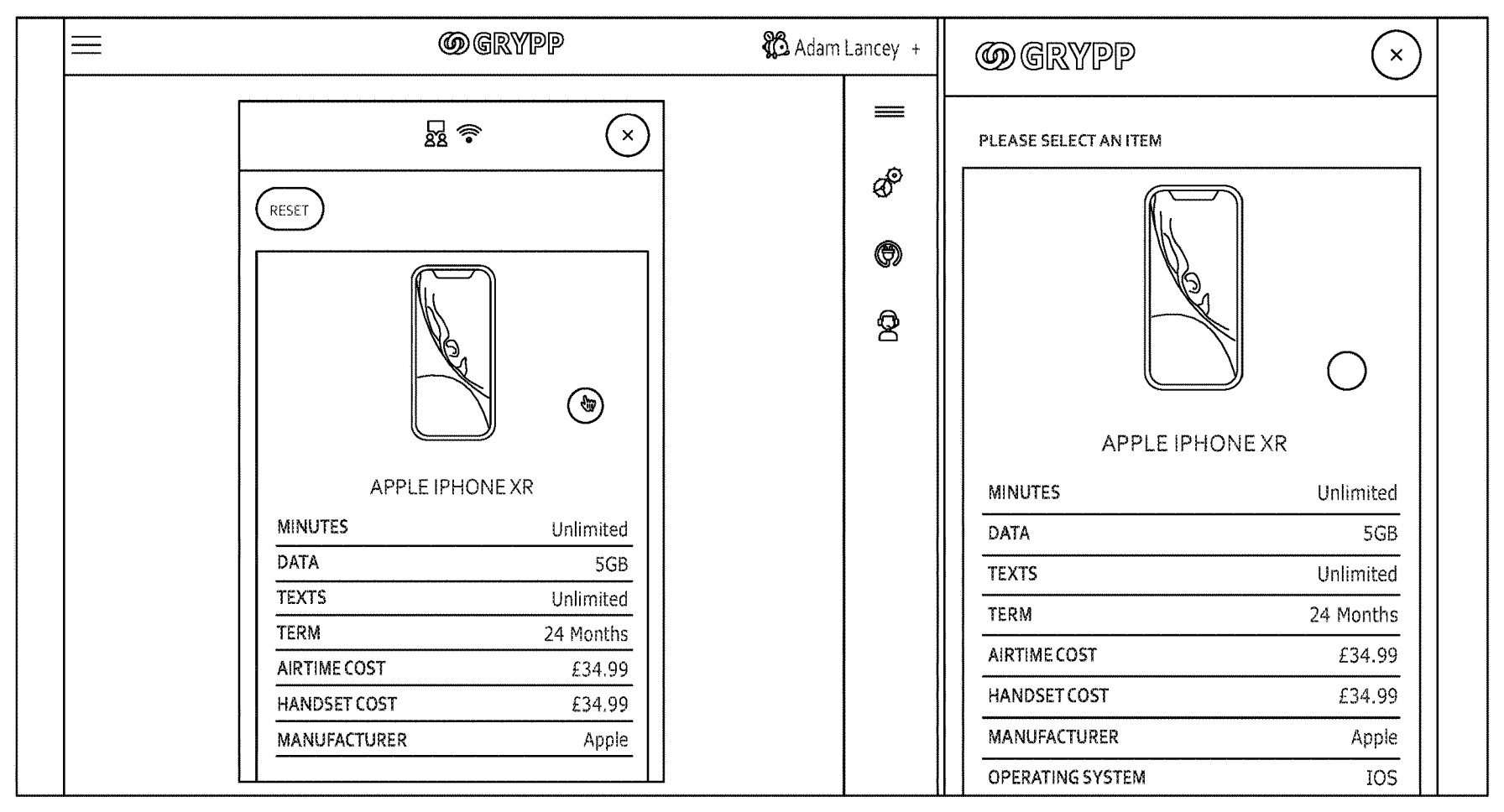

FIG. 5B shows an expanded toolbar indicating different menu options including tools, assets and an option to end the communication session (call). FIG. 5C shows the result of the agent selecting the assets option. In this example, the assets (e.g. digital content) include information regarding mobile telephones for sale with the agent being able to select various products to be presented on the first user's interface. FIG. 5D shows one such selection and illustrates how the agent's view mirrors the customer's view. FIG. 5D also shows a wand feature being selected. In this particular example, the wand feature displays a grey circle that can be moved by the agent. A similar grey circle appears on the customer's view, as shown in FIG. 5E and such a wand feature that can be used by the agent to draw the customer's attention to certain features and parts of the screen and can be used by the customer to draw the agent's attention to certain features and parts of the screen.

Figure 5F:
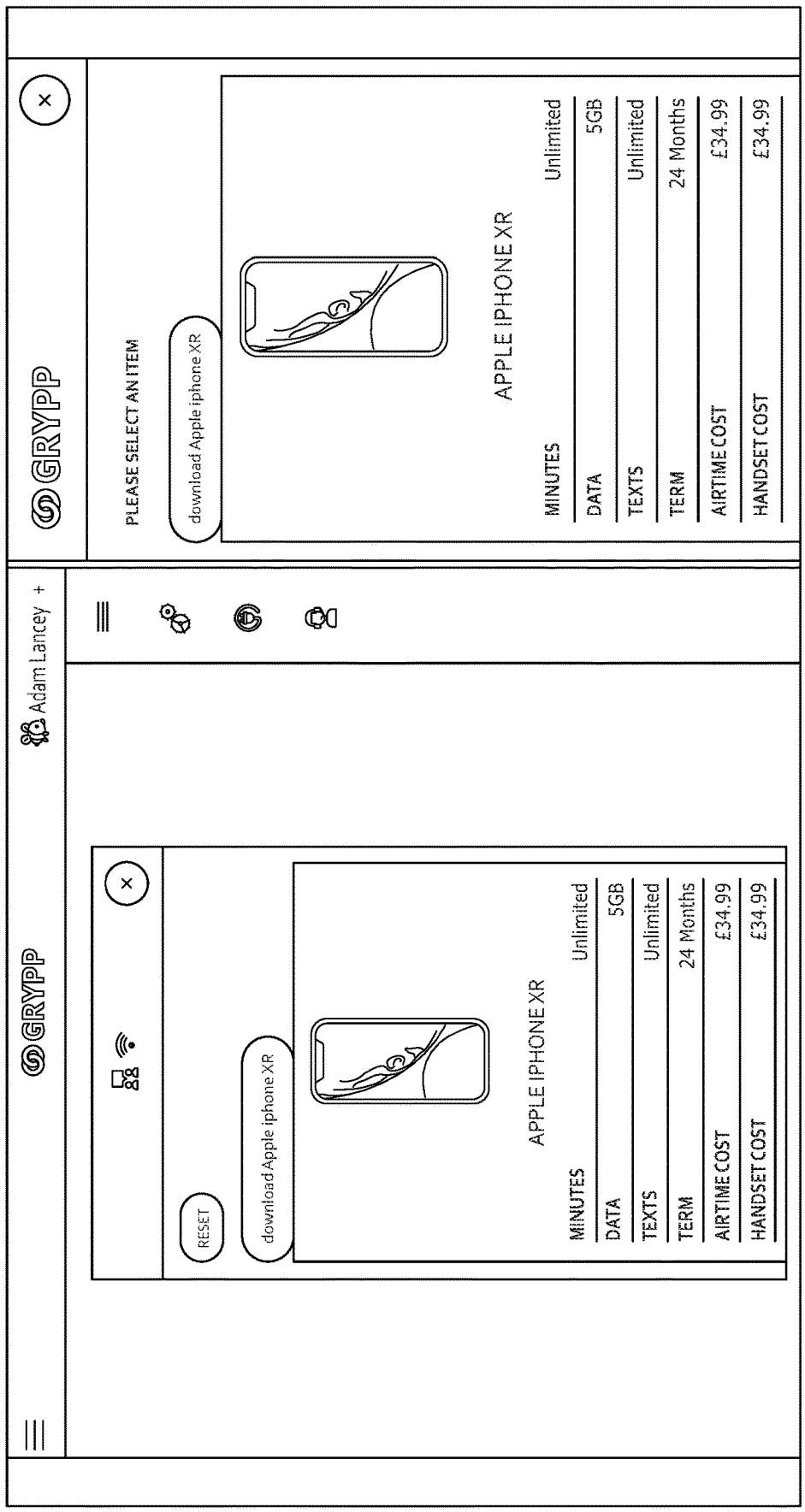
Figure 5G:
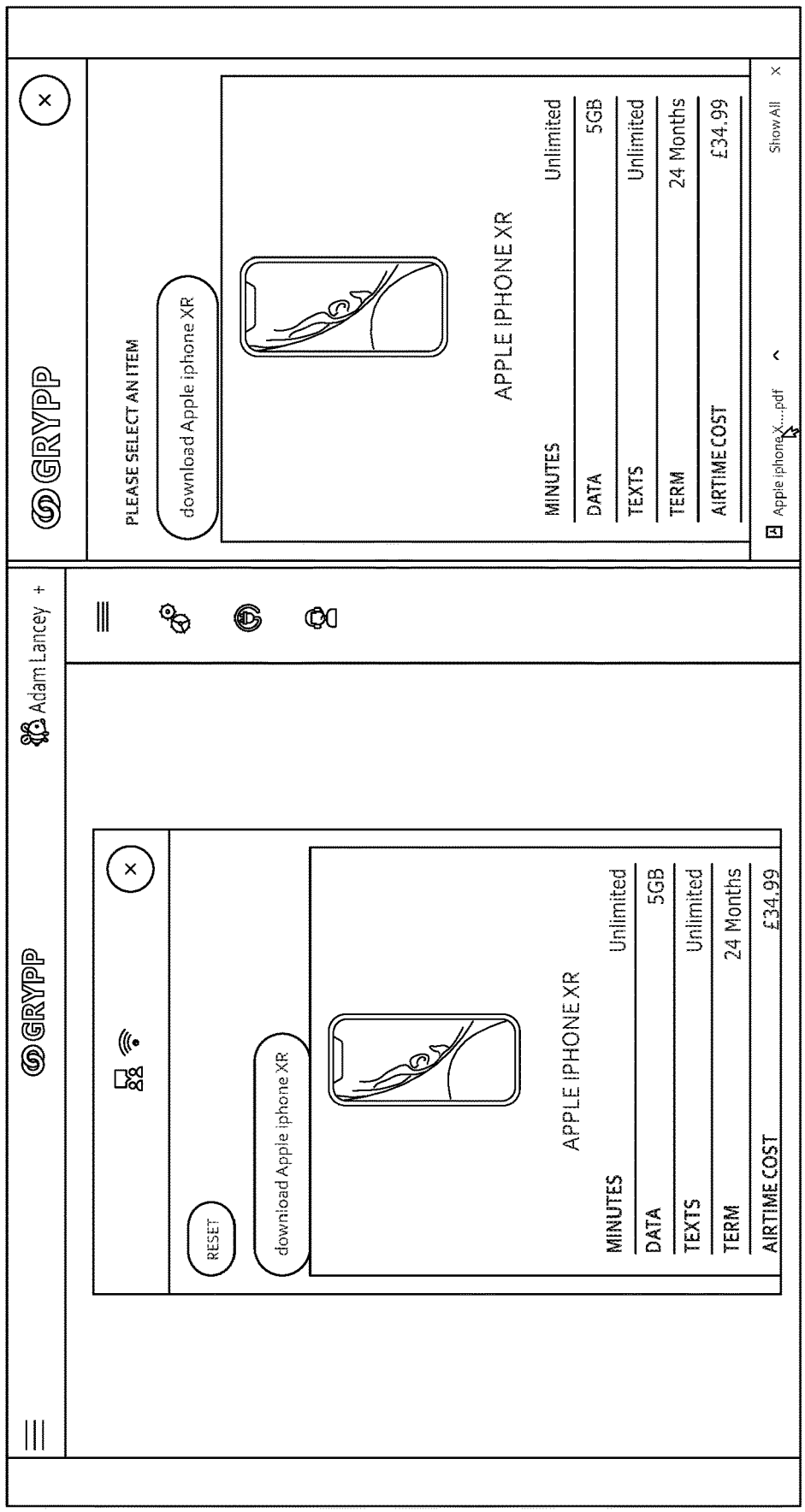

FIG. 5F shows the interfaces once the agent has added digital content. This digital content is in the form of a document that may be downloaded by the customer. As can be seen from 5F, the two interfaces are different. The agent's user interface provides editing options, whereas the customer's user interface enables the customer to select and download the digital content. FIG. 5G shows the effect of the customer clicking on the download button to download a document describing the particular product that is being reviewed.

Figure 5H:
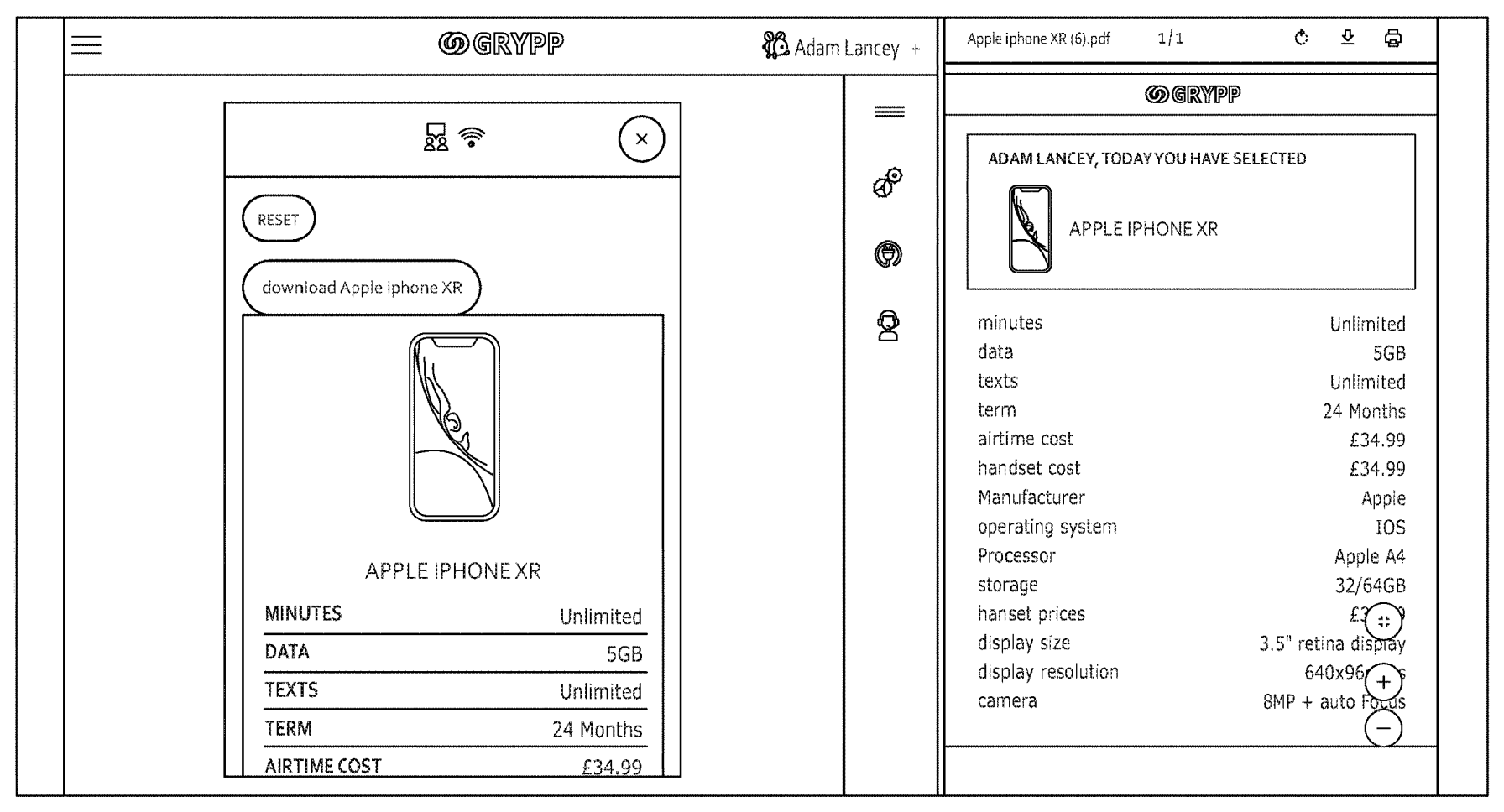

FIG. 5H shows a document once opened on the customer user interface.

Figure 6A:

FIGS. 6A to 6F show example agent user interfaces (second user interface) in various states and parts of a communication session. FIG. 6A shows how the agent's user interface can be used to customise the customer's user interface (first user interface) according to device type. In this example, the device type may be selected from desktop, tablet or mobile device.

Figure 6B:
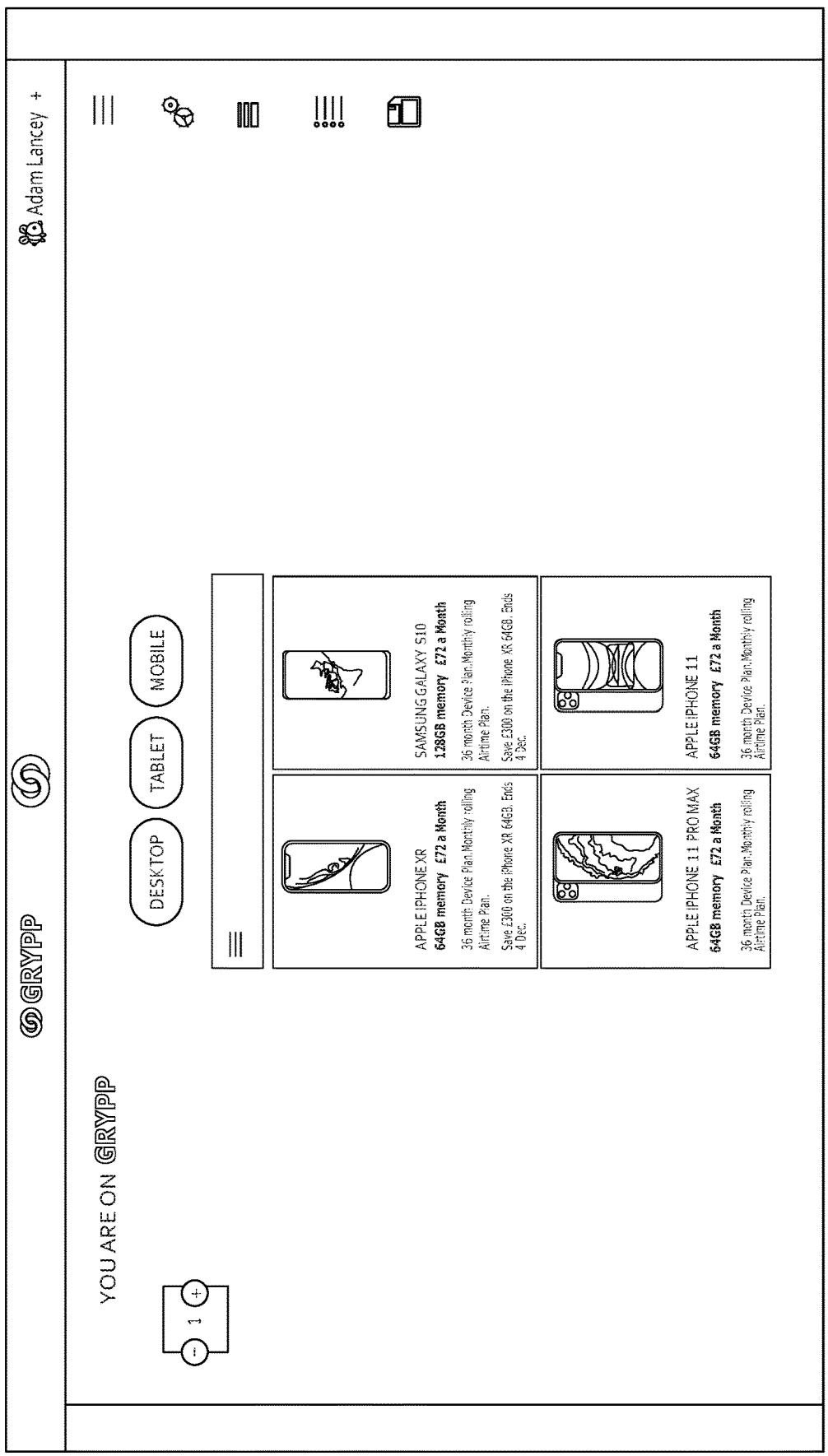
Figure 6C:
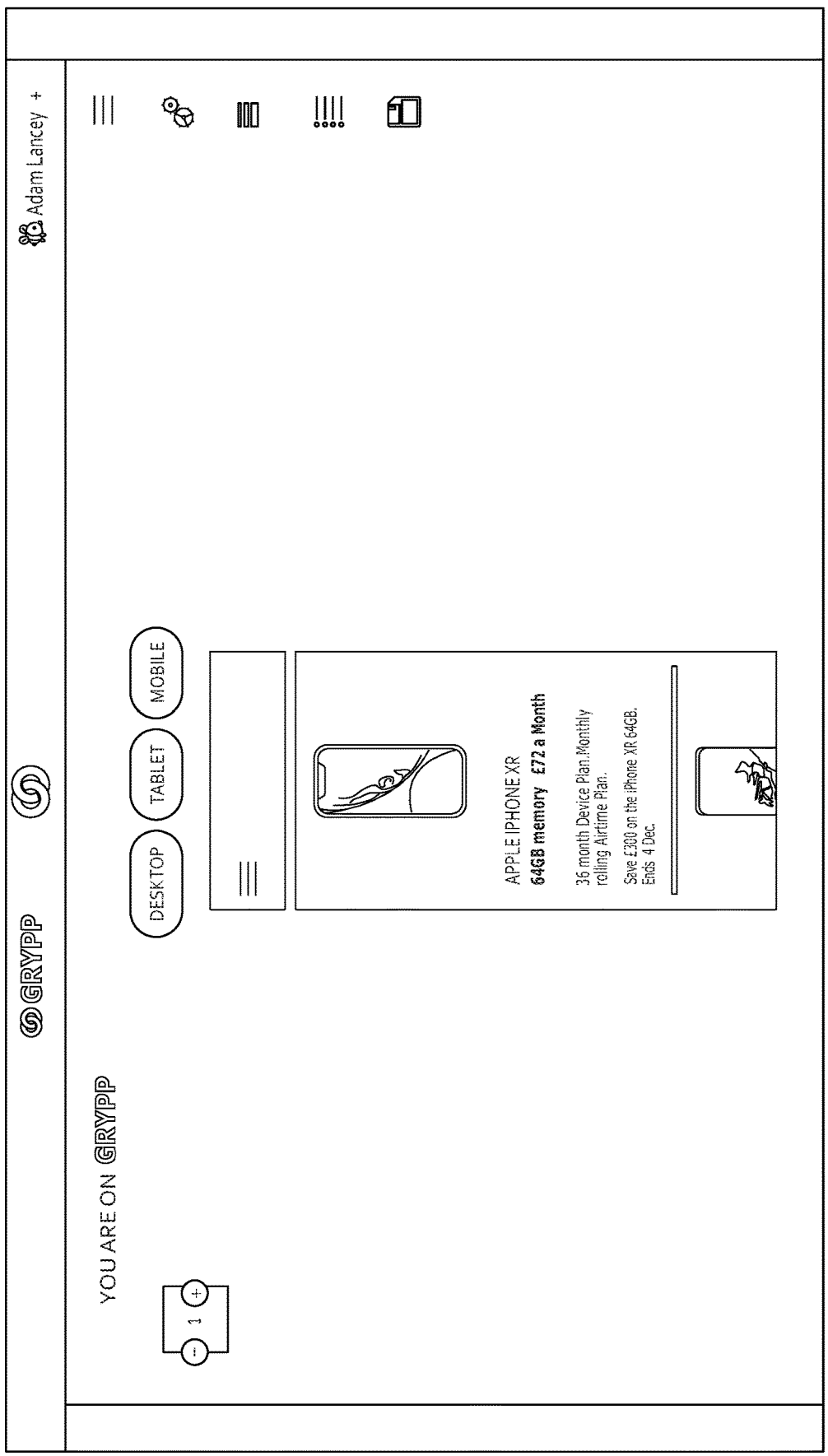

The same content is being displayed but formatted according to screen size, device type, and/or orientation of the customer's device. For example, FIG. 6B shows the format that the agent has selected for the customer when viewing on a tablet device. This reduces the number of digital content objects (mobile phone images and details) on the screen. FIG. 6C shows the format for a mobile device that would have a more reduced screen size and so fewer digital objects are being displayed.

Figure 6D:
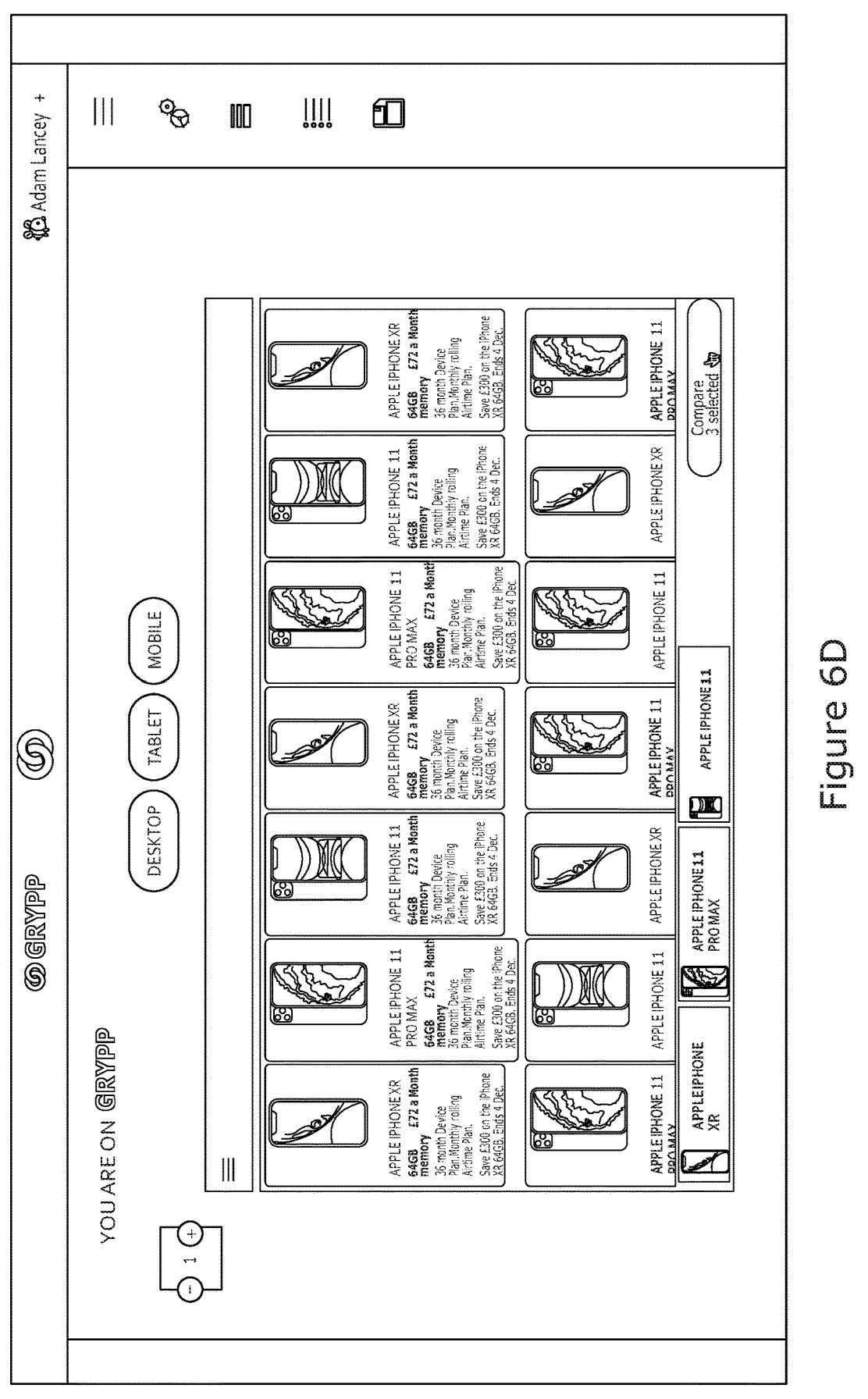
Figure 6E:
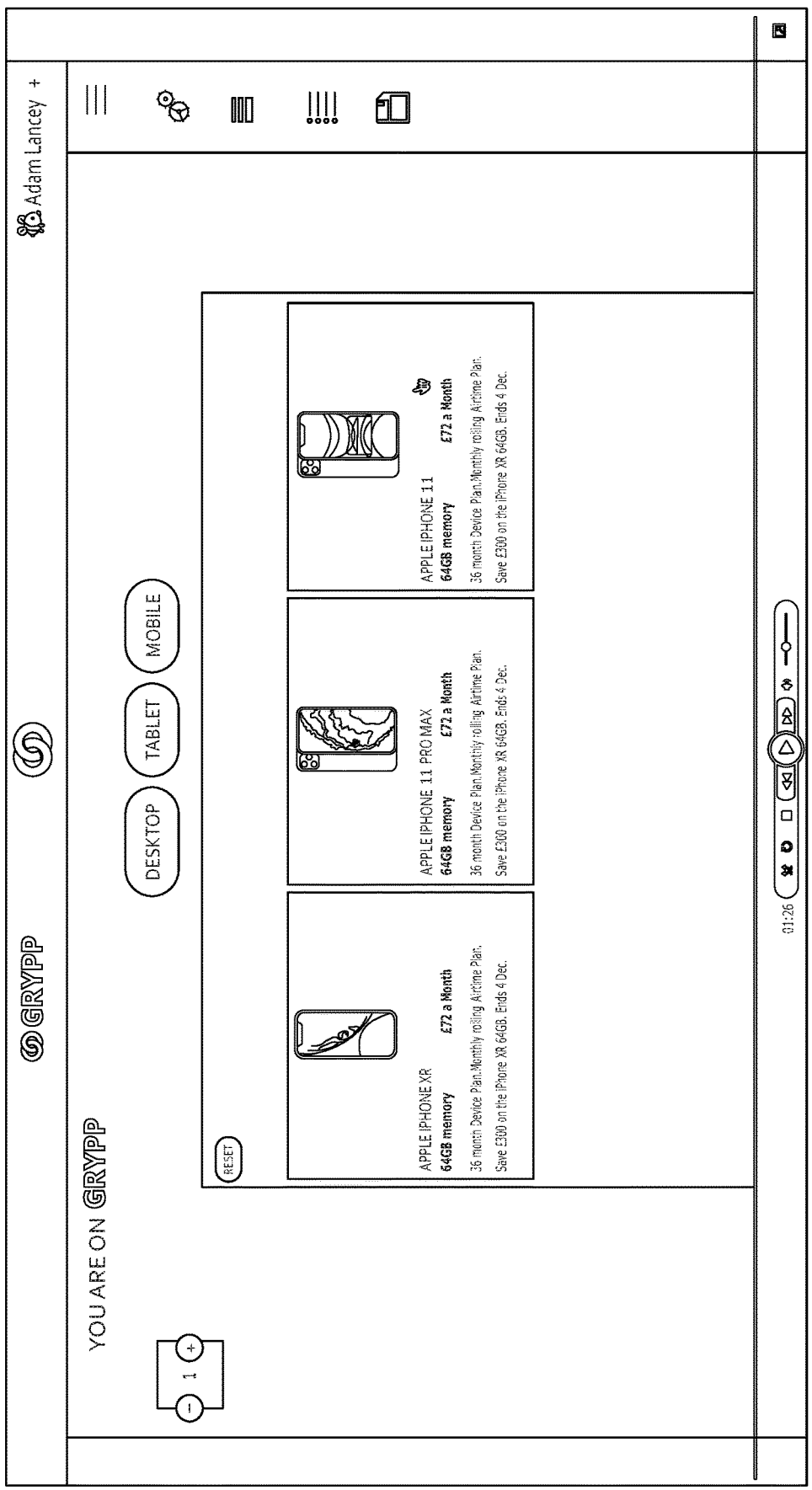

FIG. 6D reverts to the desktop view but allows the agent to build a comparison between different selectable objects. In this case, three separate mobile phones are being compared and displayed on the customer user interface. This is shown in FIG. 6E, which reduces the total number or products to three for presentation to the customer. Digital content may be linked. For example, a terms and conditions document may be linked with an image or description of a product, such as a mobile telephone. The digital content may be updated by either or both parties to a communication session and the resultant (e.g. customised, personalised, annotated or accepted document or file) may form part of the persistent addressable computing resource. Such updates are stored in the database 120. An audit trails of such additions and changes is also stored in the database 120 or elsewhere. This audit trail is presentable to any party to the communication session. Encryption techniques (e.g. hashing) may be used within the audit trail to provide a secure audit of the changes and so provide non-repudiation.

Figure 6F:
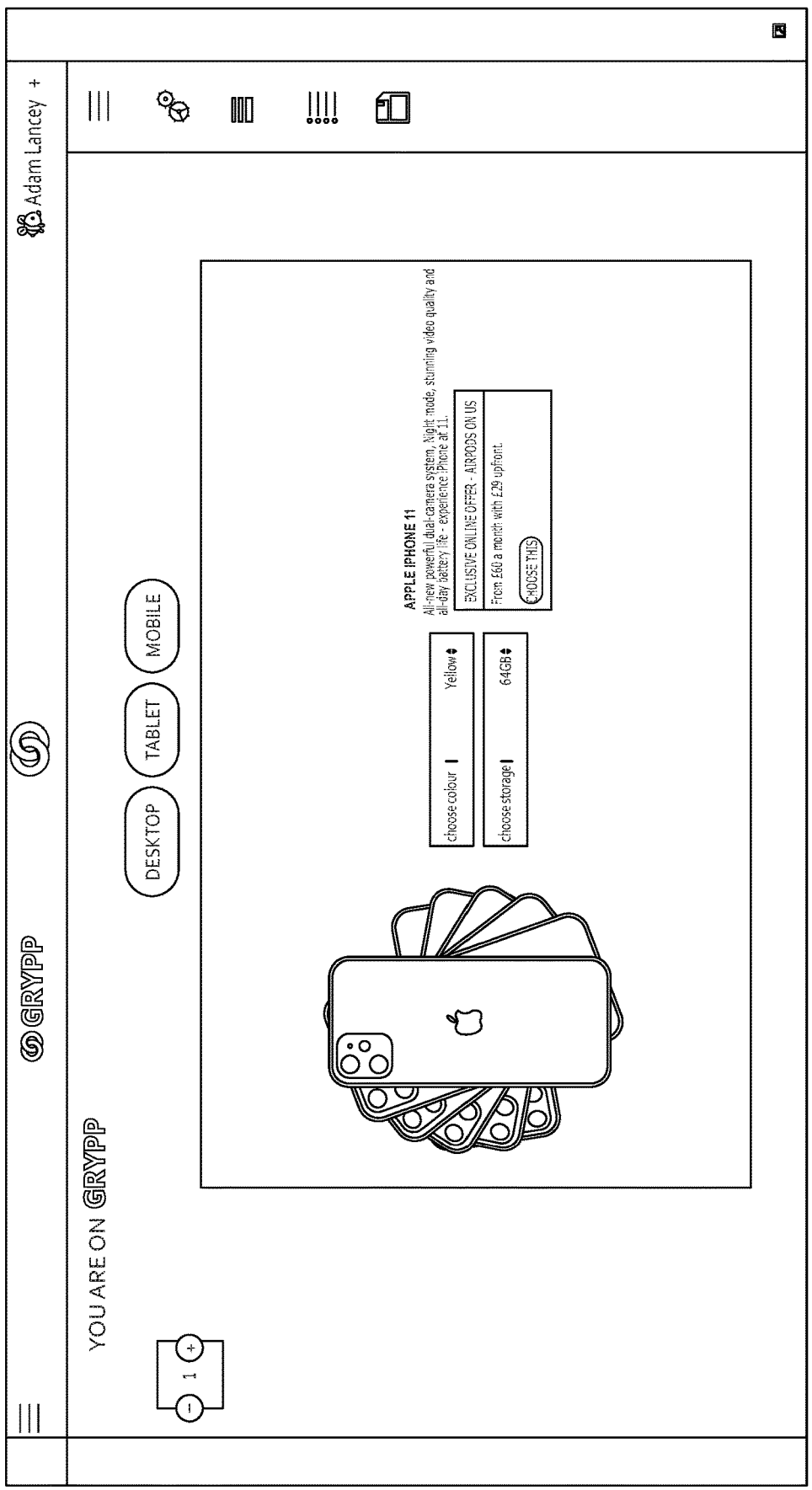

Similarly, FIG. 6F allows the agent to customise the view for a particular product or digital content.

FIGS. 7A to 7F illustrate how the system 100 can be used to initiate calls between a single agent and multiple customers (or different first users).

Figure 7A:
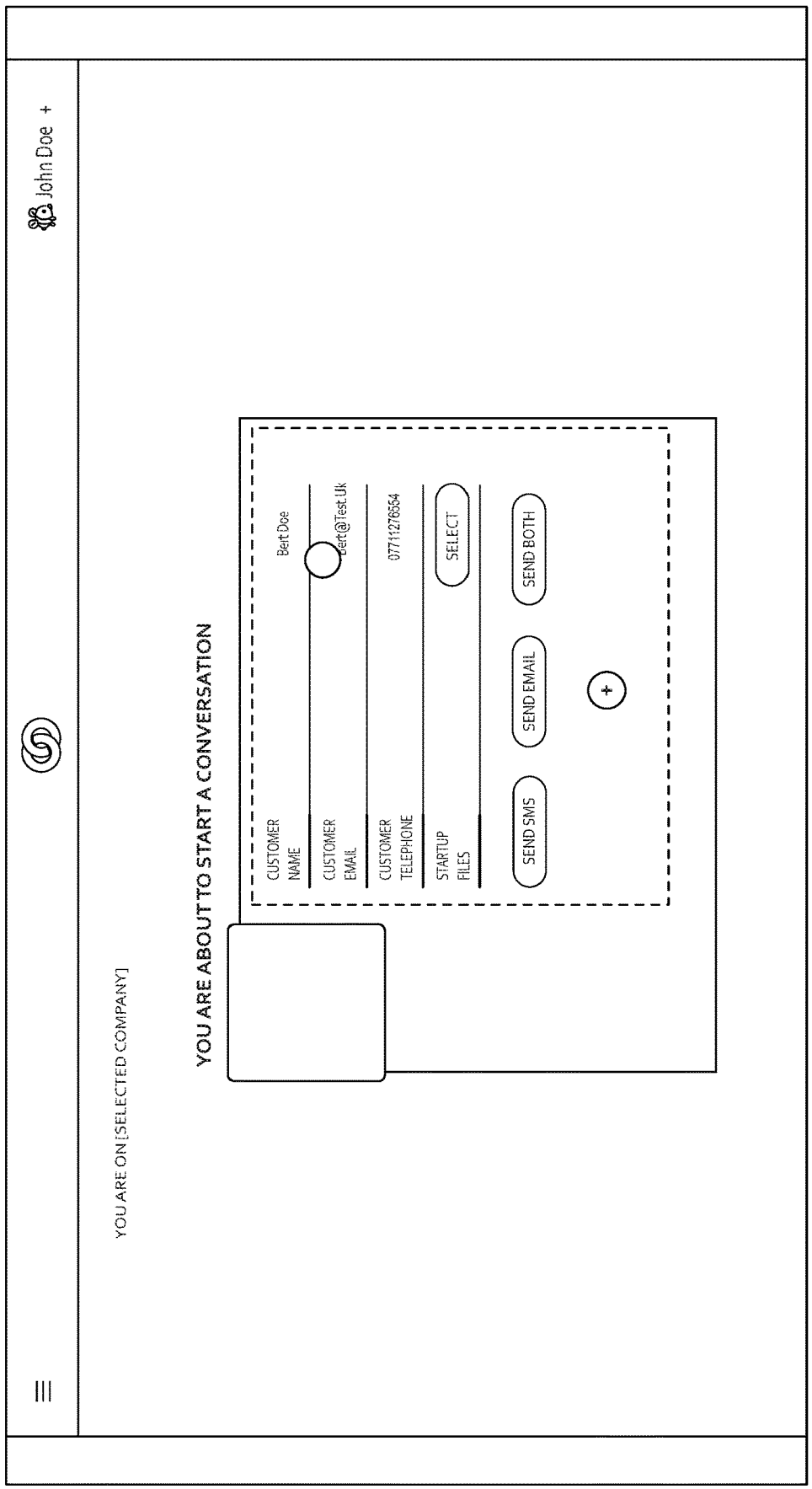
FIGS. 7A to 7D show screenshots of the user interfaces with reference to FIG. 1.

FIG. 7A shows the initiation of a single communication session with a single customer and includes fields to add the customer's details. This example shows options to send the generated invitation in various formats and different communications means, including SMS, email or both. Once this form is completed then the communication session is initiated. The customer may instead initiate the communication session, for example.

Figure 7B:
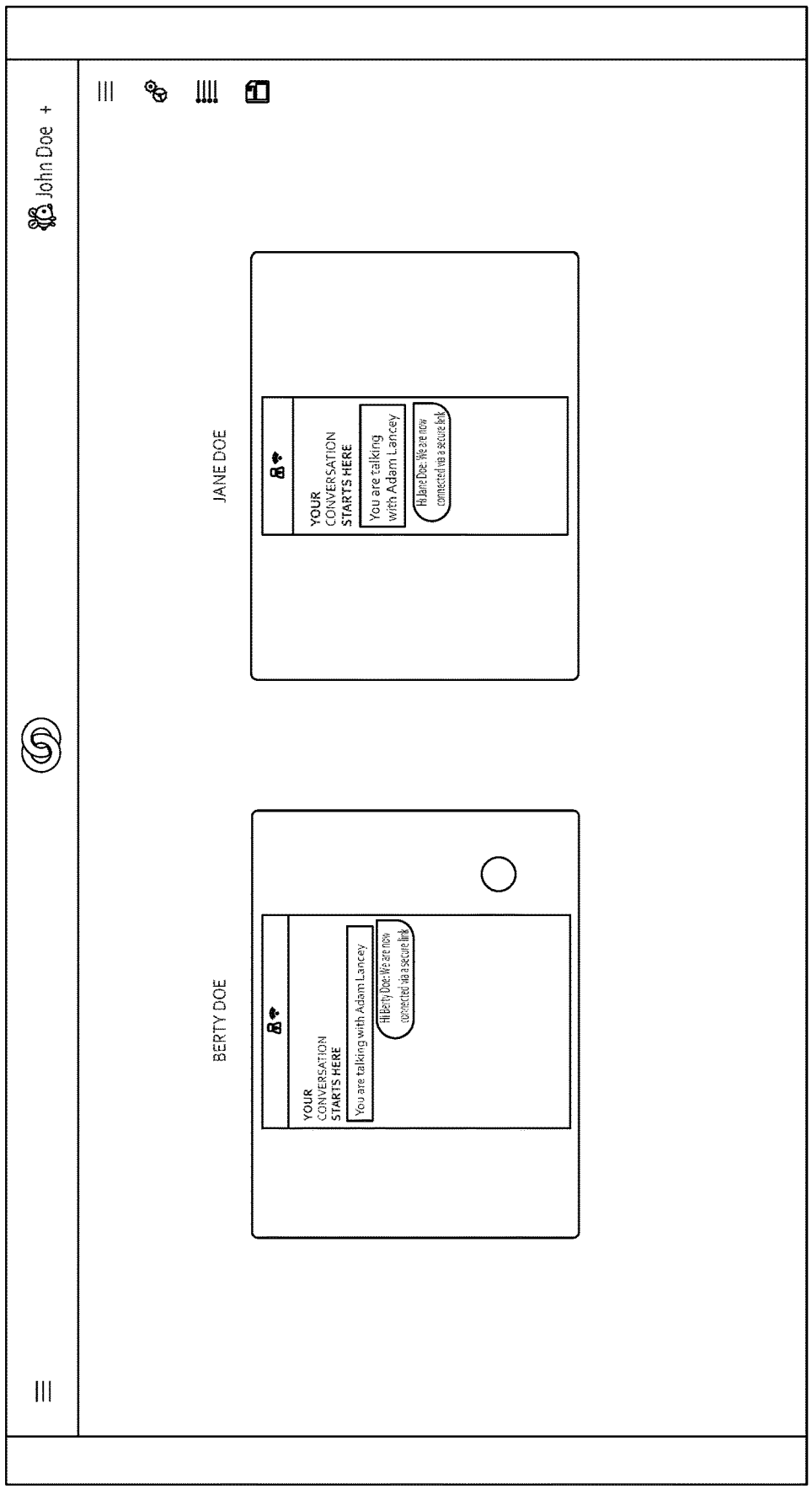

FIG. 7B shows the result of initiating more than one communication session between the agent and two different customers at the same time. As can be seen from this Figure, two separate communication sessions are in place simultaneously and so two separate invitation and communication session IDs are generated and stored in the database 120 to be sent to different customers.

Figure 7C:
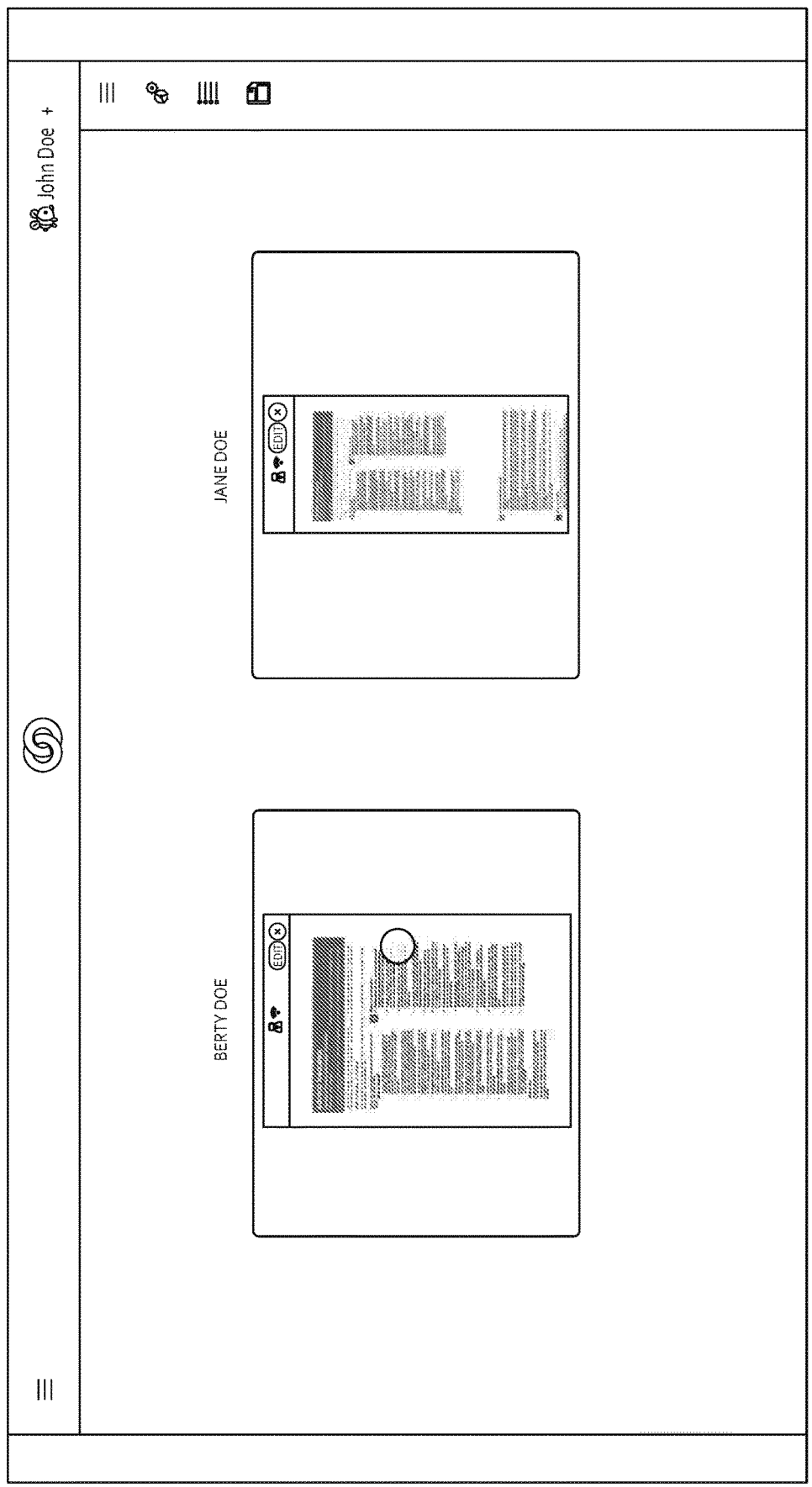
Figure 7D:
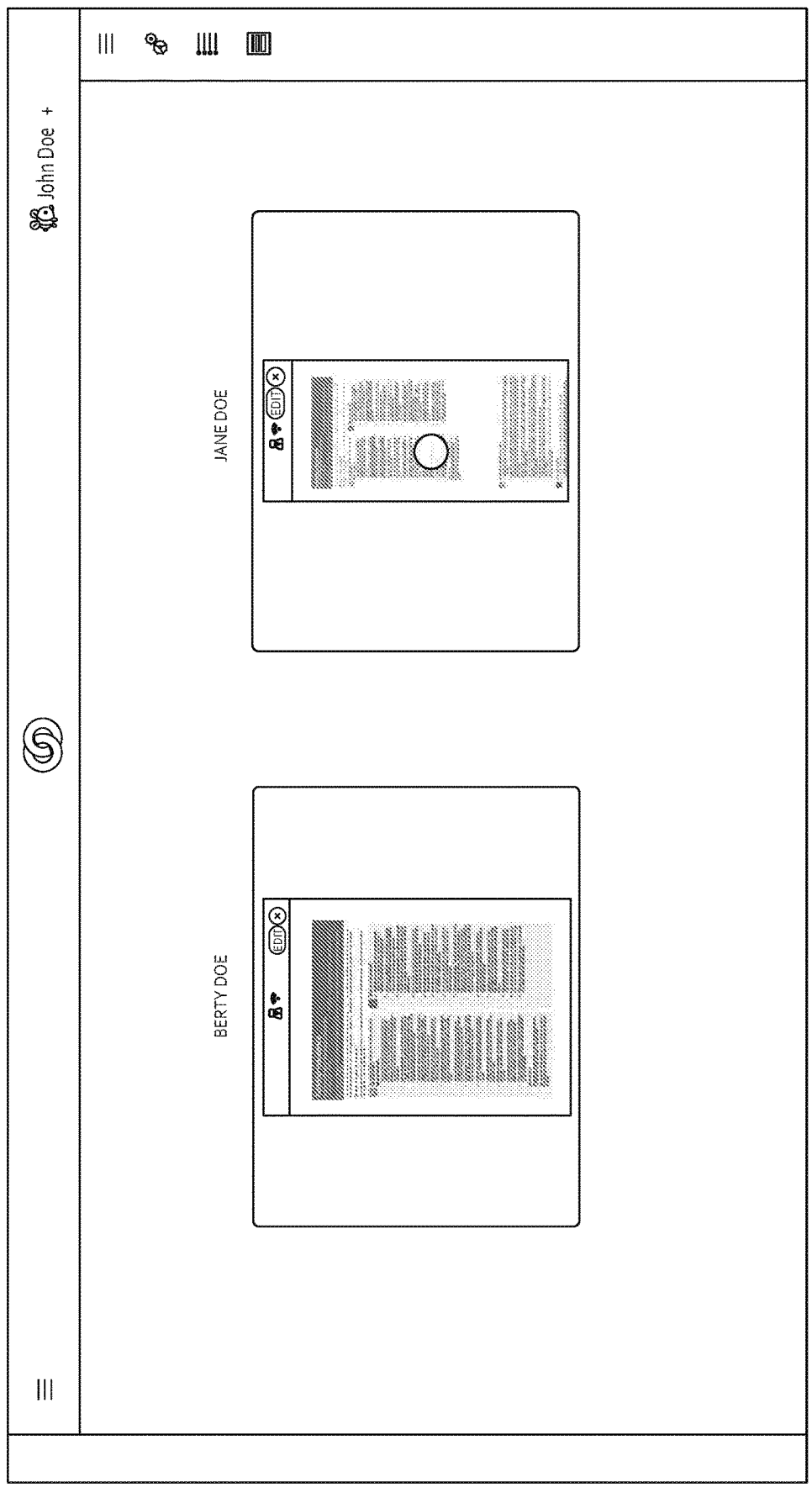

FIG. 7C shows how the agent can interact separately with each different customer on their own independent user interface. This is further illustrated in FIG. 7D.

Figure 8A:
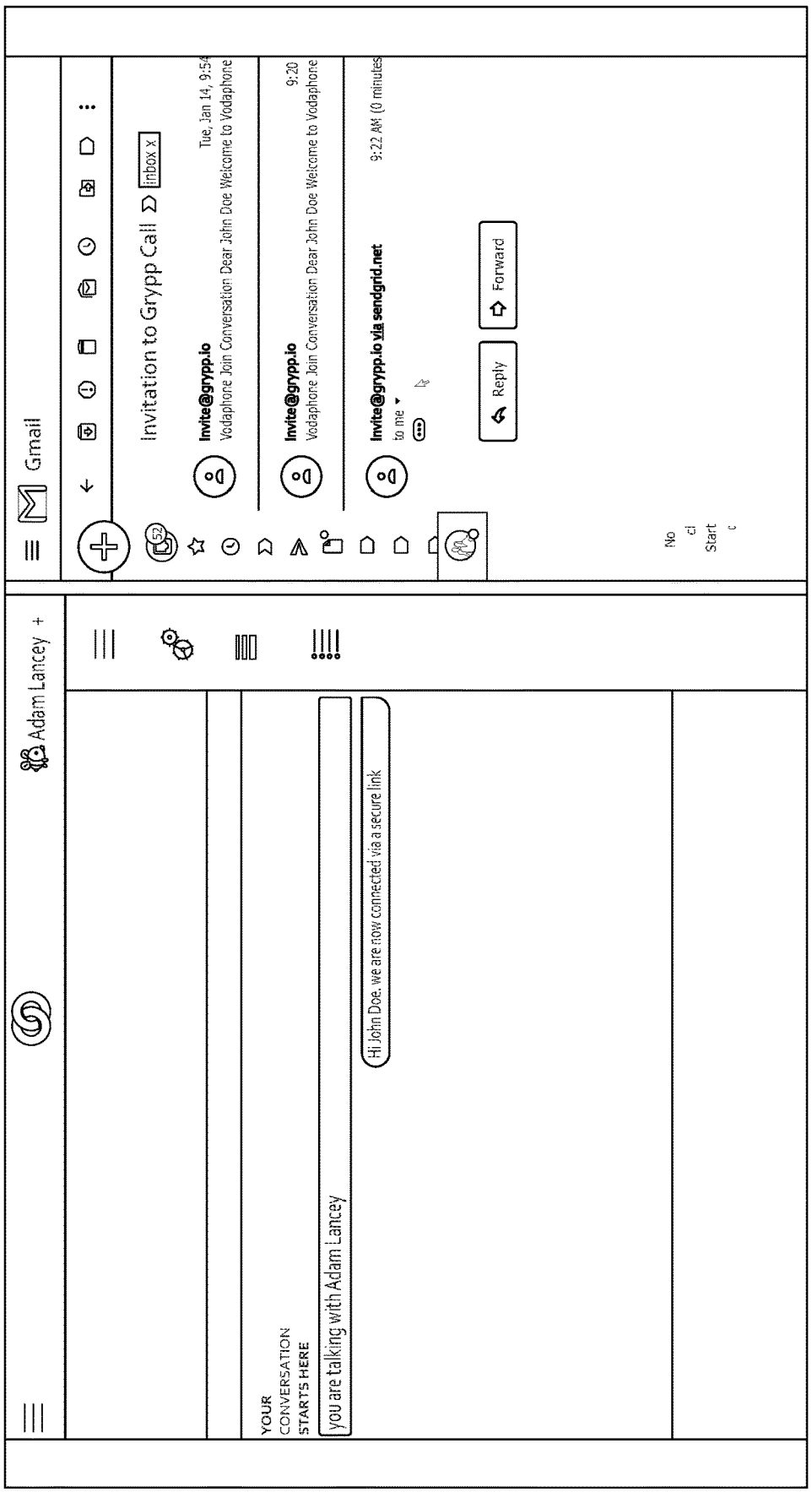
Figure 8B:
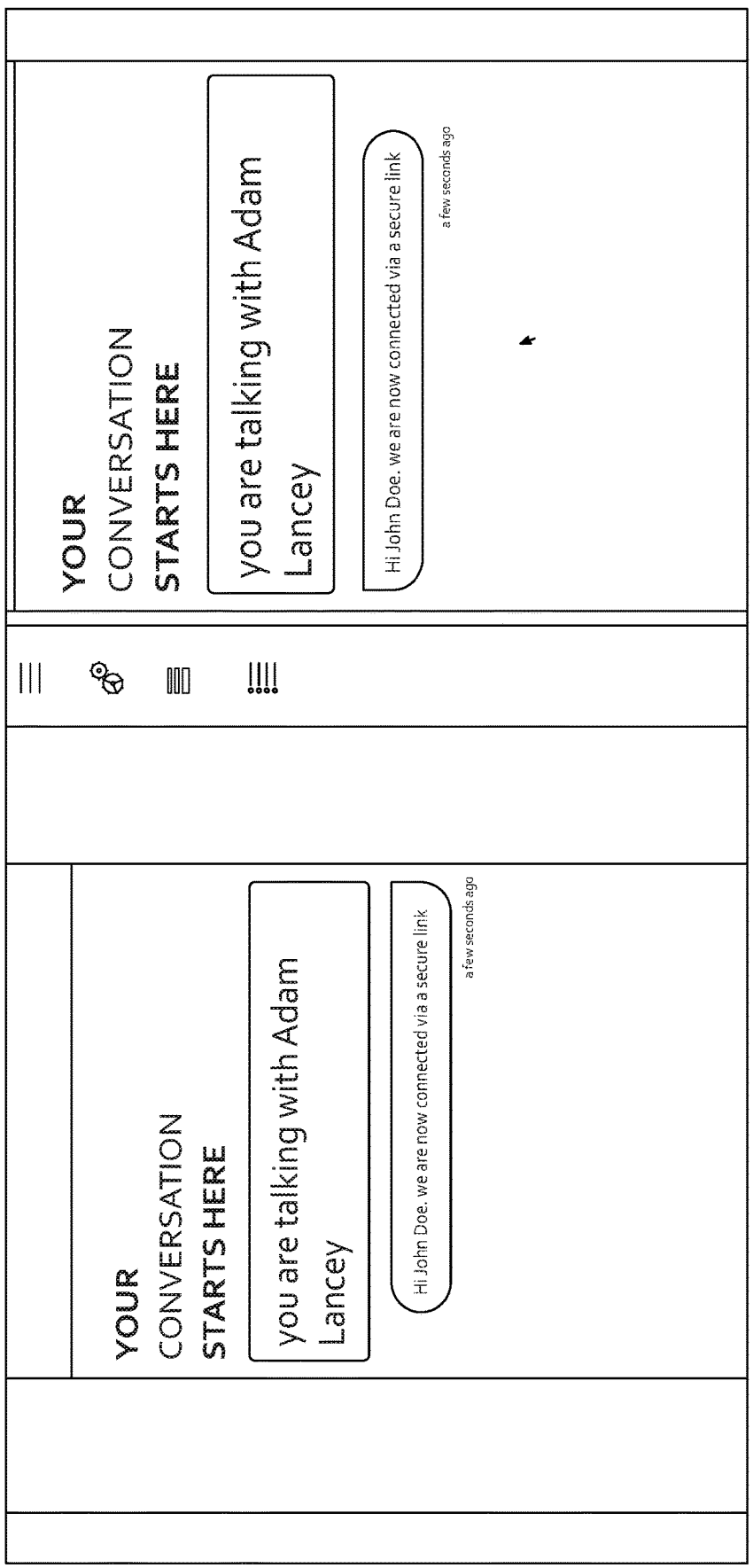
Figure 8C:
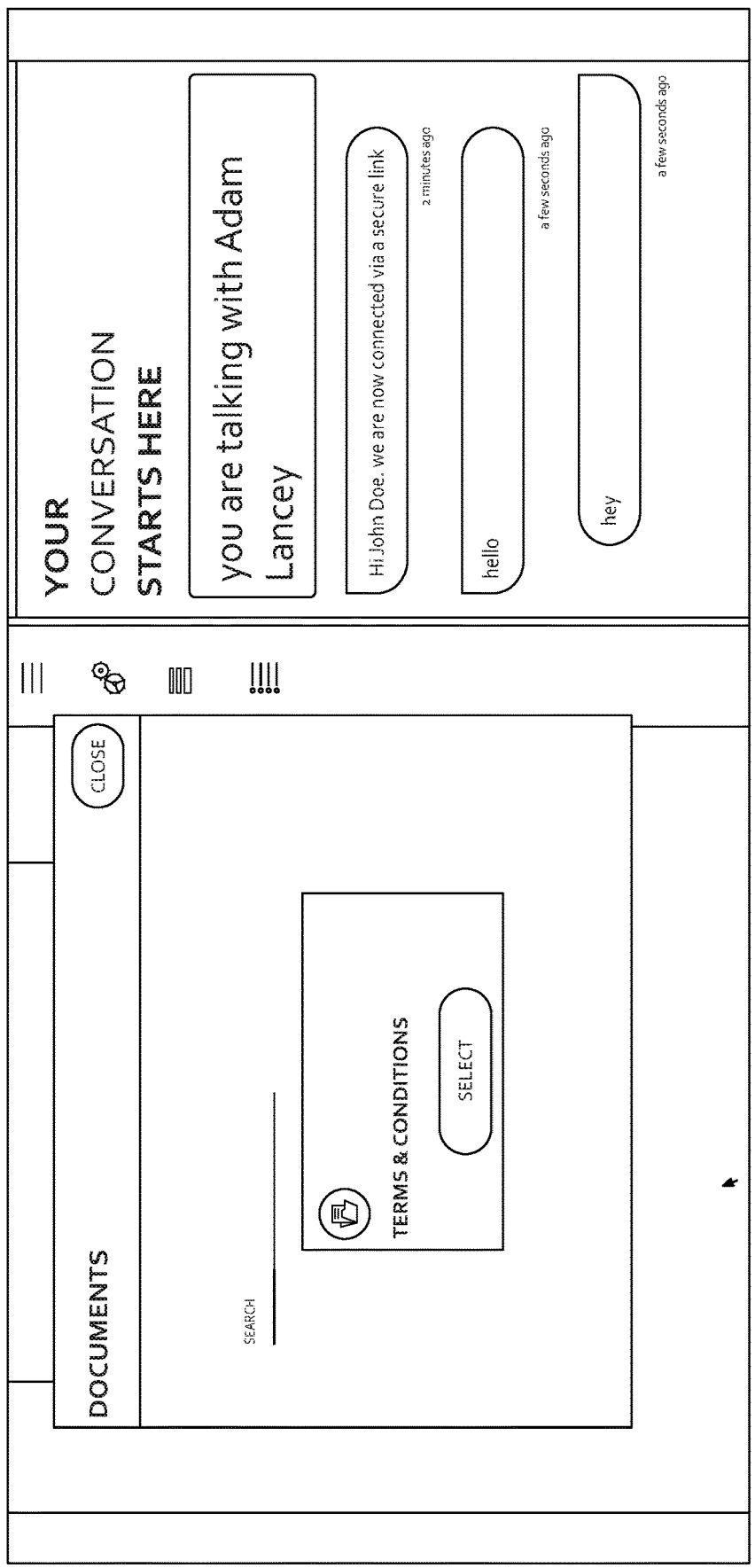

FIGS. 8A to 8J illustrate further actions that can take place during the communication session. At FIG. 8A, the invitation has been generated, sent but not yet accepted by the customer. In this example, the invitation was sent by email (it may also be sent by SMS or via social media, for example) and the right hand side of this figure shows several invitations for a customer waiting to be opened. FIG. 8B shows on the left the agent user interface (second user interface) and on the right the customer user interface (first user interface). FIG. 8C shows the agent selecting an item of digital content to be sent to the customer's user interface. In this example, the digital content is a document describing terms and conditions of a particular transaction.

Figure 8D:
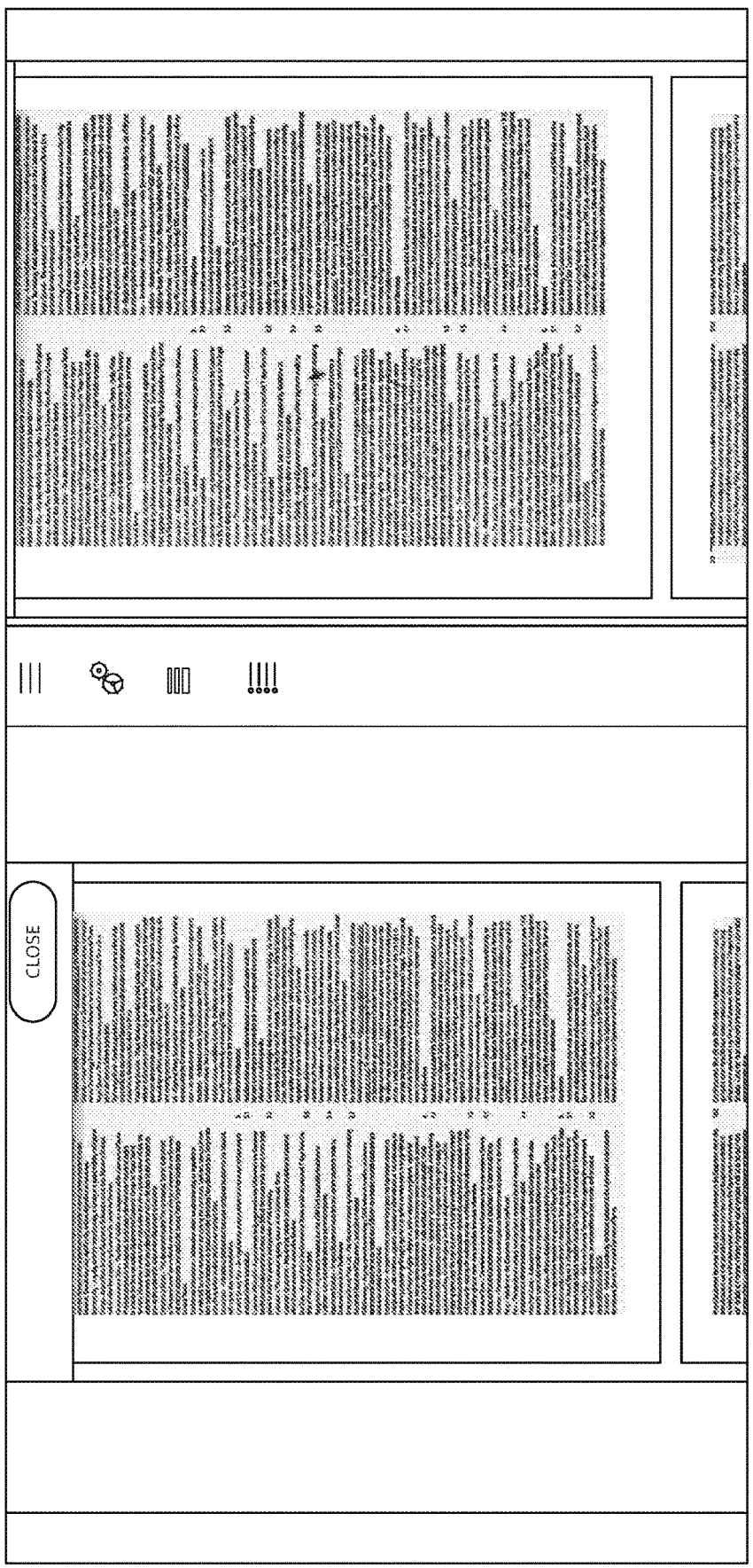

FIG. 8D shows the views of both user interfaces once the customer is viewing the digital content. This figure illustrates how the view of the customer is being mirrored on the agent's user interface. This occurs automatically so the agent can see exactly what the customer is viewing and doing with the digital content in real-time.

Figure 8E:
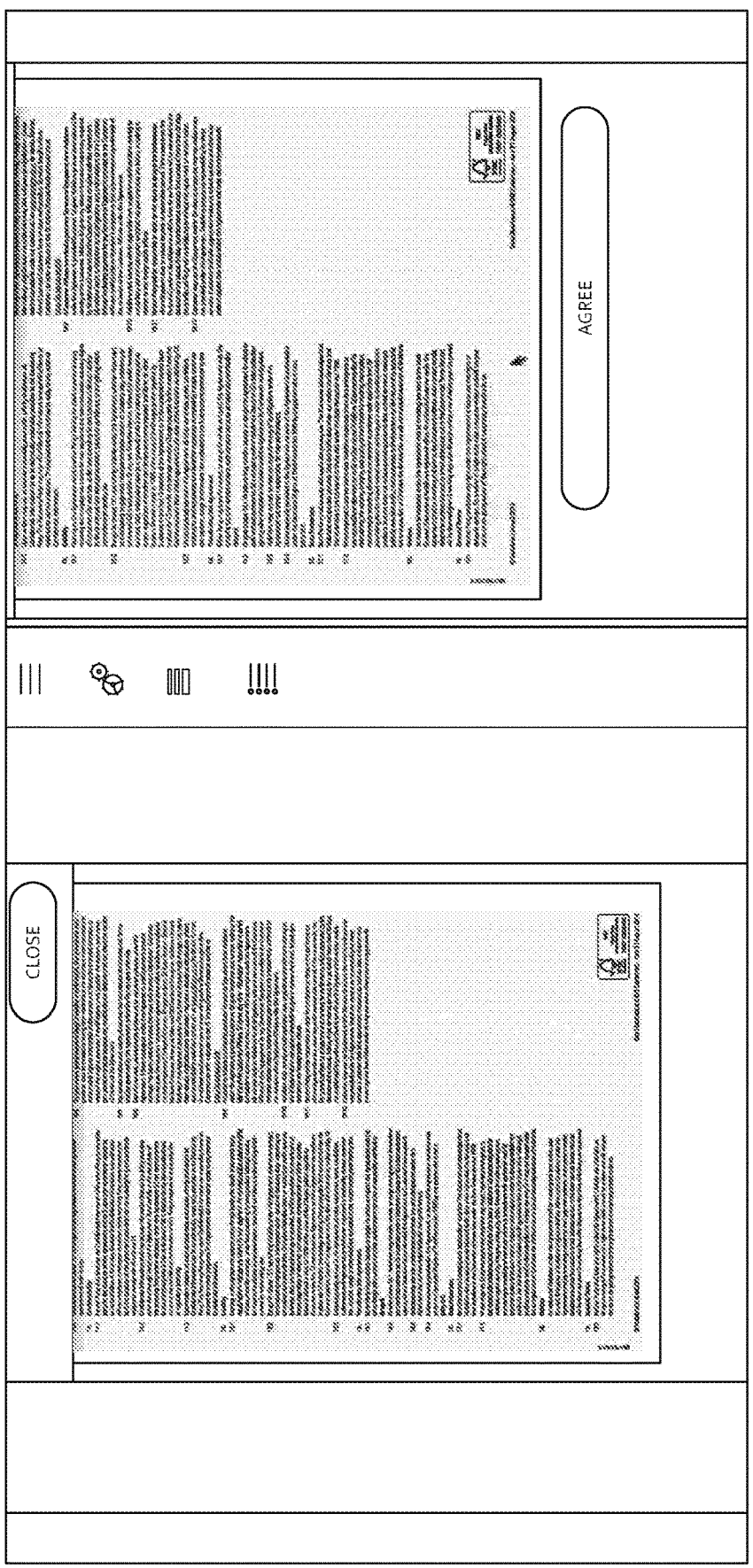
Figure 8F:
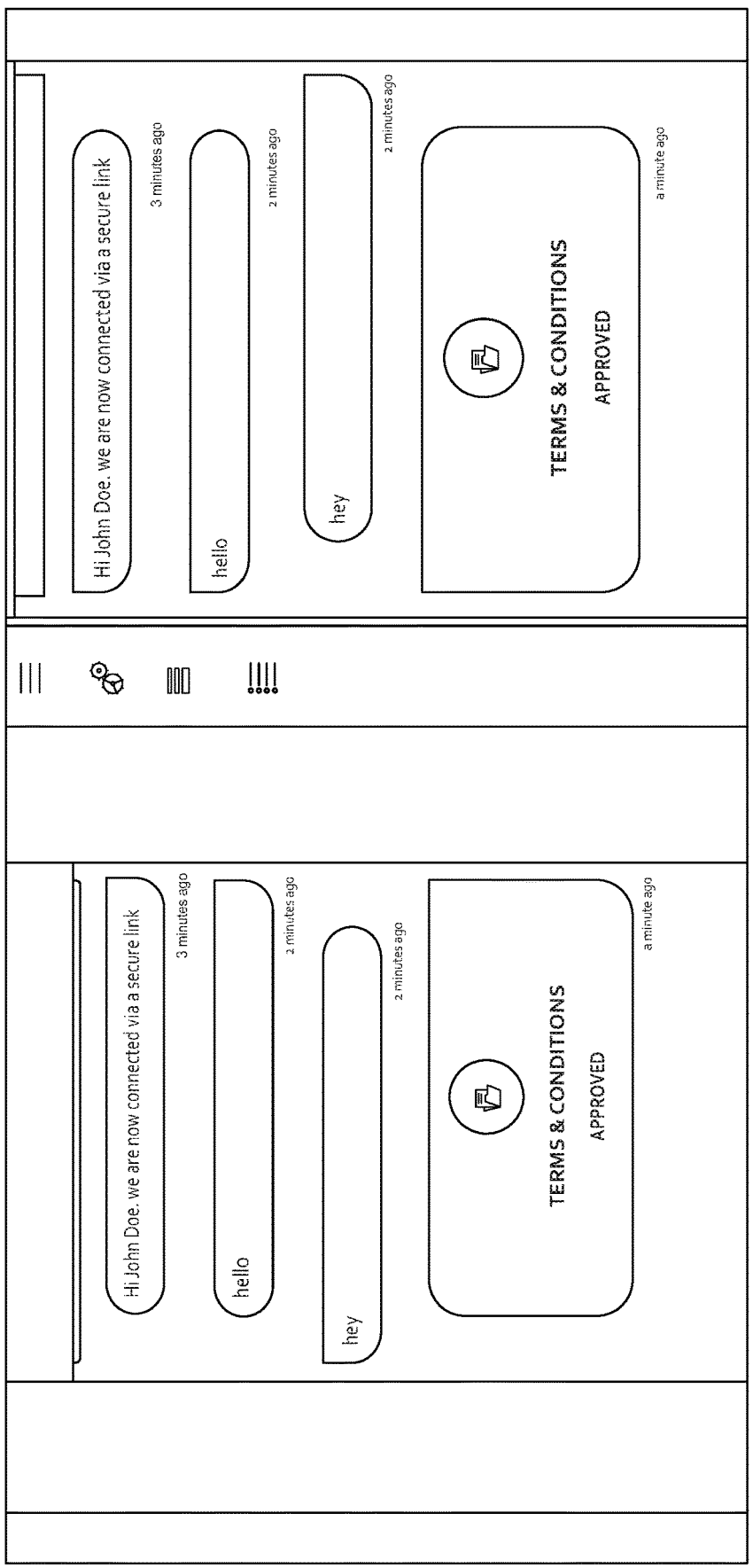

As shown in FIG. 8E, the digital content may include interactive functionality. In particular, this includes the ability for the customer to accept the terms and conditions but other interactive digital content types may be used.

Once the digital content action has been completed (in this case accepting the terms and conditions) then this result is indicated and recorded on both of the user interfaces (i.e. an entry in the communication session states that the terms and conditions have been approved by the customer) and this is reflected in the agent's view.

Figure 8G:
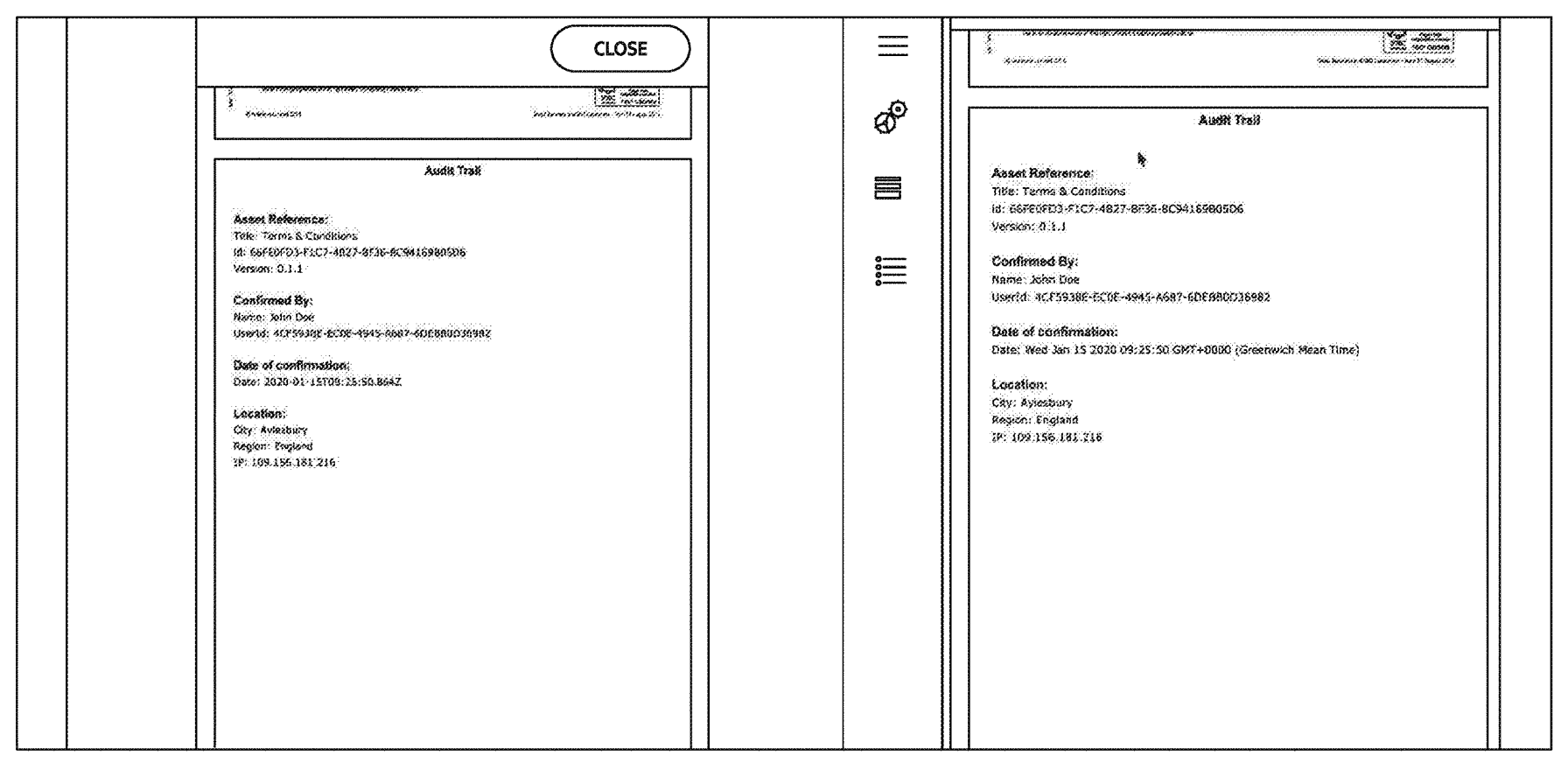

FIG. 8G shows an audit trail for this particular action so that the acceptance cannot be disputed by either party.

Figure 8H:
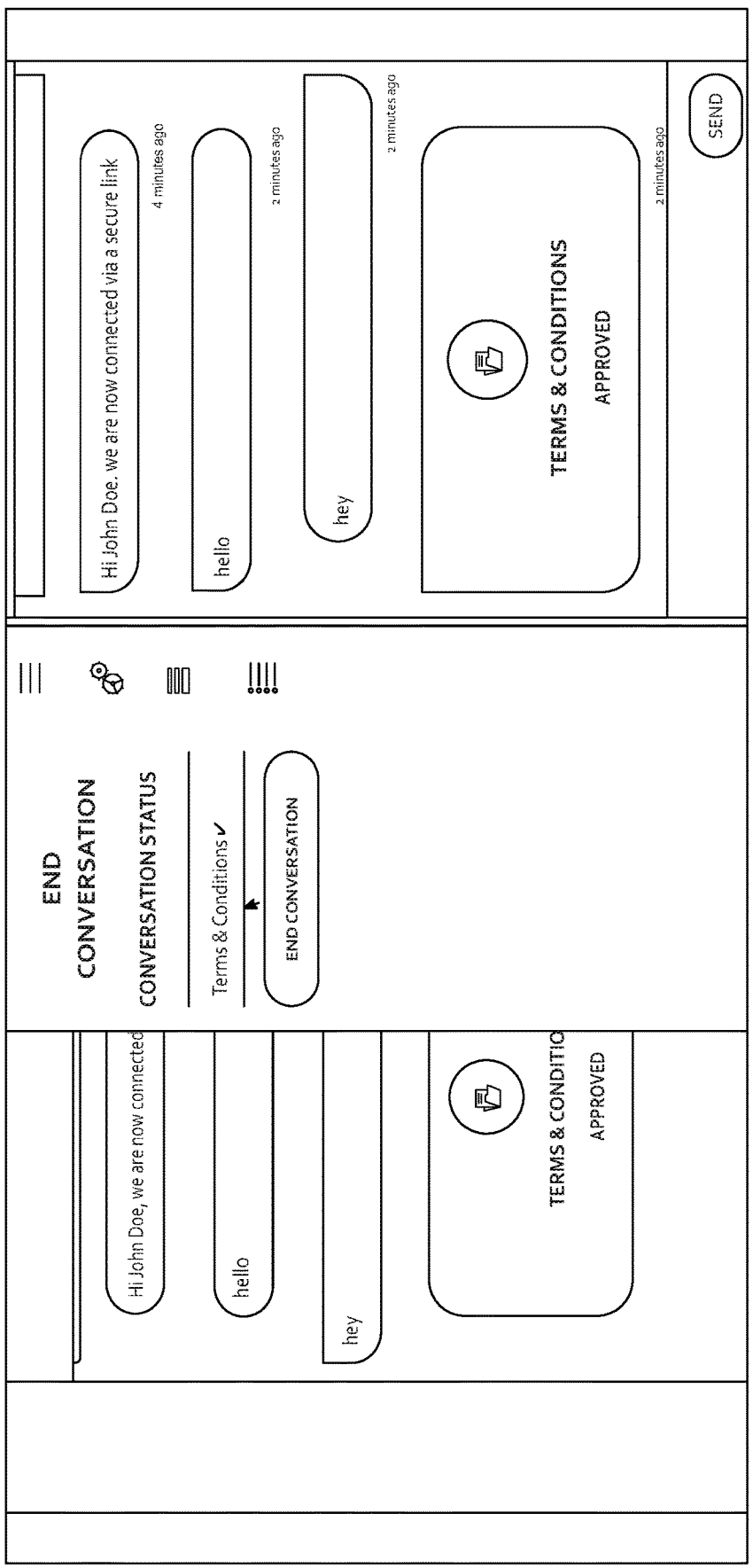

FIG. 8H shows how the agent ends the conversation using one of the tools described earlier.

Figure 8I:
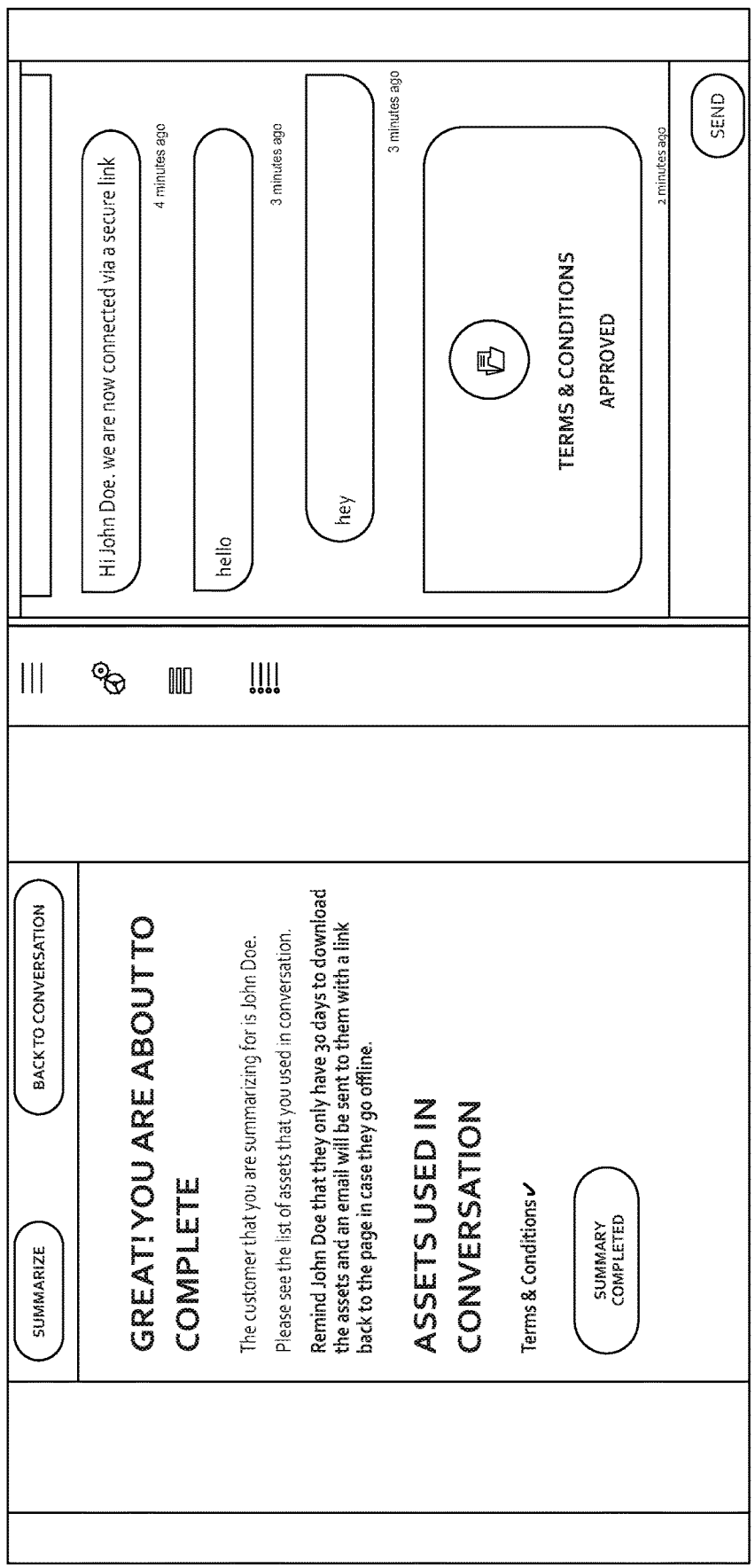
Figure 8J:
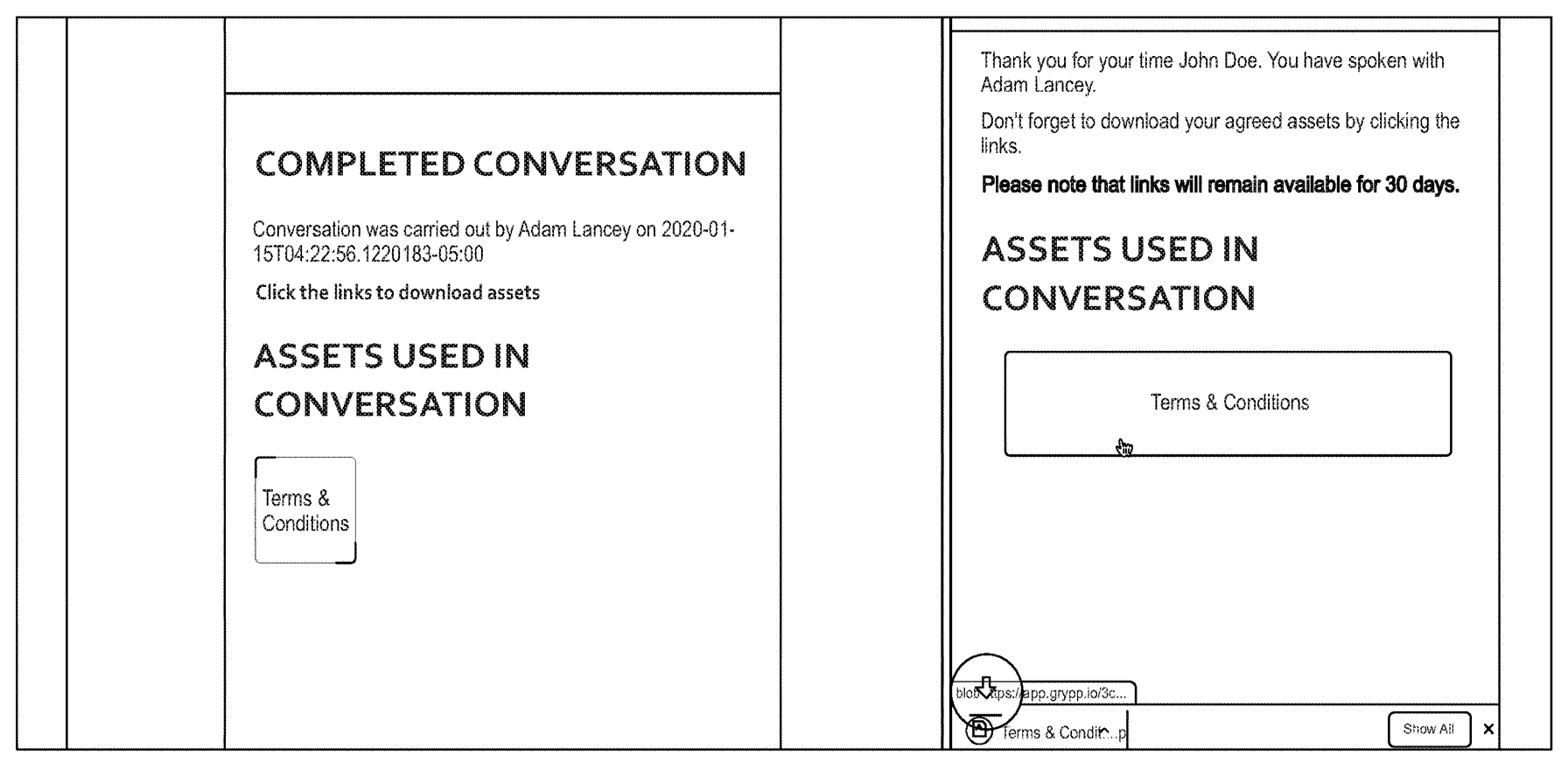

FIG. 8I shows screenshots after the communication session has ceased. On the agent's user interface a summary of the communication session can be viewed. The customer user interface shows the conservation in the state that it ended. FIG. 8J shows how the communication session acts as a computing resource after the communication session has ended, as the user maintains access to all of the content discussed, shown and reviewed during the communication session and afterwards. In an example implementation, this computing resource remains available for a fixed period of time (e.g. 30 days) but this may be configurable.

As will be appreciated by the skilled person, details of the above embodiment may be varied without departing from the scope of the present invention, as defined by the appended claims.

For example in general, the user interfaces are graphical user interfaces. The agent has been described throughout this description as a person interacting with a device having a screen. However, the agent may be implemented as an artificial intelligence system interacting with the second user interface within the system. In this case, the agent does not require a graphical user interface. Any individual feature described in one particular embodiment can be used with any other feature or in isolation.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A system comprising:
 at least one processor; and
 memory storing computer-executable instructions that, when executed by the at least one processor, cause the system to:
  generate data to render a first user interface on a display;
  provide an address for a pre-existing computing resource, wherein the pre-existing computing resource includes the data to render the first user interface in a browse mode only; and
  provide data for a second user interface, wherein the first and second users interfaces are different and further wherein the second user interface includes functionality to switch the pre-existing computing resource from the browse mode of the first user interface into a second mode of the first user interface, in which the first and second user interfaces are configured to communicate with each other within a communication session and across a network and in which the second user interface is configured to:

provide digital content within the first user interface; and change the digital content provided within the first user interface, wherein the changed digital content remains available within the computing resource via the address after the communication session between the first and second user interfaces has ceased, wherein the computer-executable instructions, when executed by the at least one processor, further cause the system to:

provide post communication session access to the changed digital content via the first user interface or second user interface, wherein the post communication session access allows the changed digital content to be edited or used to perform an action within the first user interface or second user interface.

2. The system of claim 1, wherein the first and/or second user interface are configured to cease communication with the other user interface on receiving a command.

3. The system of claim 1 further comprising:
a database; and
a server configured to store within the database the address of the computing resource and the changed digital content.

4. The system of claim 3, wherein the memory storing computer-executable instructions that, when executed by the at least one processor, further causes the system to:
generate a session identifier for the communication session between the first and second user interfaces;
associate the session identifier with the address of the computing resource; and
store the session identifier within the database.

5. The system of claim 3, wherein the server is further configured to respond to a browser request issued to the address of the computing resource and in response retrieve the stored digital content and provide the retrieved digital content to the requester in the form when the communication between the first and second user interfaces ceased.

6. The system according to claim 3, wherein the memory storing computer-executable instructions that, when executed by the at least one processor, further causes the system to store in the database a transcription of communications between the first user interface and the second user interface.

7. The system according to claim 1, wherein the address is unique; and/or
wherein the communication session between the first and second user interfaces is a chat session; and/or
wherein the network is the internet.

8. The system according to claim 1, wherein the memory storing computer-executable instructions that, when executed by the at least one processor, further causes the system to:
send an electronic invitation to a user, wherein the electronic invitation includes the address of the computing resource, wherein the first user interface is provided in response to an activation of the electronic invitation.

9. The system according to claim 1, further comprising:
a server configured to receive a browser request directed to the address of the computing resource;
retrieve digital content associated with the address of the computing resource; and
provide the digital content in response to the browser request.

10. The system according to claim 1, wherein changing the digital content rendered on the first user interface comprises any one or more of:
adding the digital content;
removing the digital content;
altering the digital content; and
recording a response to the digital content.

11. The system according to claim 1, wherein generating data to render the first user interface on the display further comprises detecting a device type used to display the user interface and format the first user interface according to the device type.

12. The system of claim 11, wherein the device type is any one of: smartphone, tablet computer, desktop computer, smart TV or other digital device.

13. The system according to claim 1, wherein generating data to render the first user interface on the display further comprises detecting an orientation of a device used to display the user interface and format the first user interface according to the device orientation; and/or
wherein generating data to render the first user interface on the display further comprises detecting a change in window size and/or aspect ratio used to display the user interface and format the first user interface according to the changed window size and/or aspect ratio.

14. The system of claim 13, wherein formatting the first user interface according to the changed window size and/or aspect ratio occurs in real-time.

15. The system according to claim 1, wherein the memory storing computer-executable instructions that, when executed by the at least one processor, further causes the system to:
display within the second user interface an indication of what is currently being displayed on the first user interface, including any changes made to the orientation, window size and/or aspect ratio of the first user interface; and/or mirror an action occurring within the second user interface on the first user interface.

16. The system of claim 15, wherein the action includes any one or more of: moving a cursor, typing text, highlighting, clicking, pointing and digital content opening.

17. The system according to claim 1, wherein the address for the computing resource is a Uniform Resource Locator, URL; and/or
wherein the address of the computing resource expires after a predetermined time.

18. The system according to claim 1, wherein the first user interface includes functionality to:
provide digital content within the second user interface; and/or
change the digital content provided within the second user interface.

19. A method comprising:
generating data to render a first user interface on a display;
providing an address for a pre-existing computing resource, wherein the pre-existing computing resource includes the data to render the first user interface in a browse mode only; and
providing data for a second user interface, wherein the first and second users interfaces are different and further wherein the second user interface includes functionality to switch the pre-existing computing resource from the browse mode of the first user interface into a second mode of the first user interface, in which the first and second user interfaces are configured to communicate with each other within a communication session and across a network and in which the second user interface is configured to:

provide digital content within the first user interface; and change the digital content provided within the first user interface, wherein the changed digital content remains available within the computing resource via the address after the communication session between the first and second user interfaces has ceased;

wherein the method further comprises:

providing post communication session access to the changed digital content via the first user interface or second user interface, wherein the post communication session access allows the changed digital content to be edited or used to perform an action within the first user interface or second user interface.

20. A computer-readable medium comprising instructions which, when executed by a computer, cause the computer to carry out the method of claim 19.

21. The system according to claim 1, wherein the action comprises purchasing goods and/or services included in the computing resource accessible by the address and/or initiating a further communication session after the communication session has ceased.

22. The system according to claim 1, wherein the digital content is a website.

23. The system according to claim 1, wherein the second user interface is configured to render a view of the first user interface within the second user interface.

24. The system according to claim 23, wherein the first user interface and the second user interface include different functionality and the first user interface does not include functionality to provide other digital content within the second user interface or change the other digital content provided within the second user interface.

25. The system according to claim 23, wherein the computer-executable instructions, when executed by the at least one processor, further cause the system to:

generate further data to render a third user interface on a further display; and provide a further address for a further pre-existing computing resource, wherein the further pre-existing computing resource includes the further data to render the third user interface in the browse mode only;

wherein second user interface includes further functionality to:

provide further digital content within the third user interface; and change the digital content provided within the third user interface;

wherein providing the data for the second user interface comprises providing a multi-view interface such that, during a time period in which the second user interface is configured to render the view of the first user interface within the second user interface, the second user interface is further configured to render a view of the third user interface and provide functionality to selectively enter each view rendered via the multi-view interface.

* * * * *